US009363640B2

(12) United States Patent  (10) Patent No.: US 9,363,640 B2
Lee  (45) Date of Patent: Jun. 7, 2016

(54) ELECTRONIC SYSTEM WITH TRANSFORMABLE MODE MECHANISM AND METHOD OF OPERATION THEREOF

(71) Applicant: Samsung Electronics Co., Ltd., Suwon-si, Gyeonggi-Do (KR)

(72) Inventor: Sung Hyuck Lee, Menlo Park, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 25 days.

(21) Appl. No.: 14/452,388

(22) Filed: Aug. 5, 2014

(65) Prior Publication Data

US 2016/0044463 A1    Feb. 11, 2016

(51) Int. Cl.
*H04W 4/02* (2009.01)
*H04W 8/22* (2009.01)

(52) U.S. Cl.
CPC ............... *H04W 4/025* (2013.01); *H04W 8/22* (2013.01)

(58) Field of Classification Search
CPC .... A61B 5/1118; A61B 5/6824; A61B 5/681; A61B 5/02438; A61B 5/6801; A61B 5/117; G06F 3/017; G06F 1/1694; G08B 21/0453; G08B 21/0446; H04W 4/025
See application file for complete search history.

(56) References Cited

U.S. PATENT DOCUMENTS

| 6,636,161 | B2 | 10/2003 | Rosenberg |
| 7,456,823 | B2 | 11/2008 | Poupyrev et al. |
| 8,166,421 | B2 | 4/2012 | Magal et al. |
| 8,170,186 | B2 | 5/2012 | Kuiken et al. |
| 8,221,229 | B2 | 7/2012 | Mikhailov et al. |
| 8,292,833 | B2 | 10/2012 | Son et al. |
| 8,462,109 | B2 | 6/2013 | Nasiri et al. |
| 8,543,240 | B2 | 9/2013 | Itkowitz et al. |
| 2007/0021073 | A1 | 1/2007 | Gratton |
| 2007/0175322 | A1 | 8/2007 | Baum et al. |
| 2008/0174550 | A1 | 7/2008 | Laurila et al. |
| 2011/0018794 | A1 | 1/2011 | Linsky et al. |
| 2012/0131098 | A1 | 5/2012 | Wood et al. |
| 2012/0204133 | A1 | 8/2012 | Guendelman et al. |
| 2013/0173171 | A1* | 7/2013 | Drysdale ............... A61B 5/1118 702/19 |
| 2013/0324248 | A1 | 12/2013 | Wilson et al. |
| 2014/0035875 | A2 | 2/2014 | Theimer et al. |
| 2014/0055352 | A1* | 2/2014 | Davis ...................... G06F 3/017 345/156 |

OTHER PUBLICATIONS

Cho et al., "A Distributed Wearable System based on Multimodal Fusion", Embedded Software and Systems, Lecture Notes in Computer Science, vol. 423, 2007, pp. 369-378.
Lee et al., "Actual Remote Control: A Wearable Remote Control on Wrist", Digest of Technical Papers International Conference on Consumer Electronics, 2009.

* cited by examiner

*Primary Examiner* — Curtis Odom
(74) *Attorney, Agent, or Firm* — IP Investment Law Group

(57) ABSTRACT

An electronic system includes a control unit configured to determine a physical configuration based on a sensor reading; determine a device location for establishing a device proximity to a target device; generate an operational mode based on the physical configuration and the device proximity; and a communication unit, coupled to the control unit, configured to send an input signal for interacting with the target device through a client device.

30 Claims, 8 Drawing Sheets though the views in the drawings for ease of description generally show similar orientations, this depiction in the figures is arbitrary for the most part. Generally, the invention can be operated in any orientation.

ELECTRONIC SYSTEM WITH TRANSFORMABLE MODE MECHANISM AND METHOD OF OPERATION THEREOF

TECHNICAL FIELD

An embodiment of the present invention relates generally to an electronic system, and more particularly to a system with a transformable mode mechanism.

BACKGROUND

Modern portable client and industrial electronics, especially client devices such as electronic watches, wristbands, health monitors, smartphones, tablets, and combination devices are providing increasing levels of functionality to support modern life including facilitating interactions with other electronic devices and appliances. Research and development in the existing technologies can take a myriad of different directions.

As users become more empowered with the growth of portable devices, new and old paradigms begin to take advantage of this new device space. There are many technological solutions to take advantage of this new device capability to communicate with other devices. However, users often must rely on multiple portable devices to meet the growing needs of modern lifestyles.

Thus, a need still remains for an electronic system with a transformable mode mechanism appropriate for today's connected devices. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: determine a physical configuration based on a sensor reading; determine a device location for establishing a device proximity to a target device; generate an operational mode based on the physical configuration and the device proximity; and a communication unit, coupled to the control unit, configured to send an input signal for interacting with the target device through a client device.

An embodiment of the present invention provides a method of operation of an electronic system including: determining, with a control unit, a physical configuration based on a sensor reading; determining a device location for establishing a device proximity to a target device; generate an operational mode based on the physical configuration and the device proximity; and sending, with a communication unit coupled to the control unit, an input signal for interacting with the target device through the client device.

An embodiment of the present invention provides a non-transitory computer readable medium including instructions for execution by a control unit including: determining a physical configuration based on a sensor reading; determining a device location for establishing a device proximity to a target device; generate an operational mode based on the physical configuration and the device proximity; and sending an input signal for interacting with the target device through the client device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
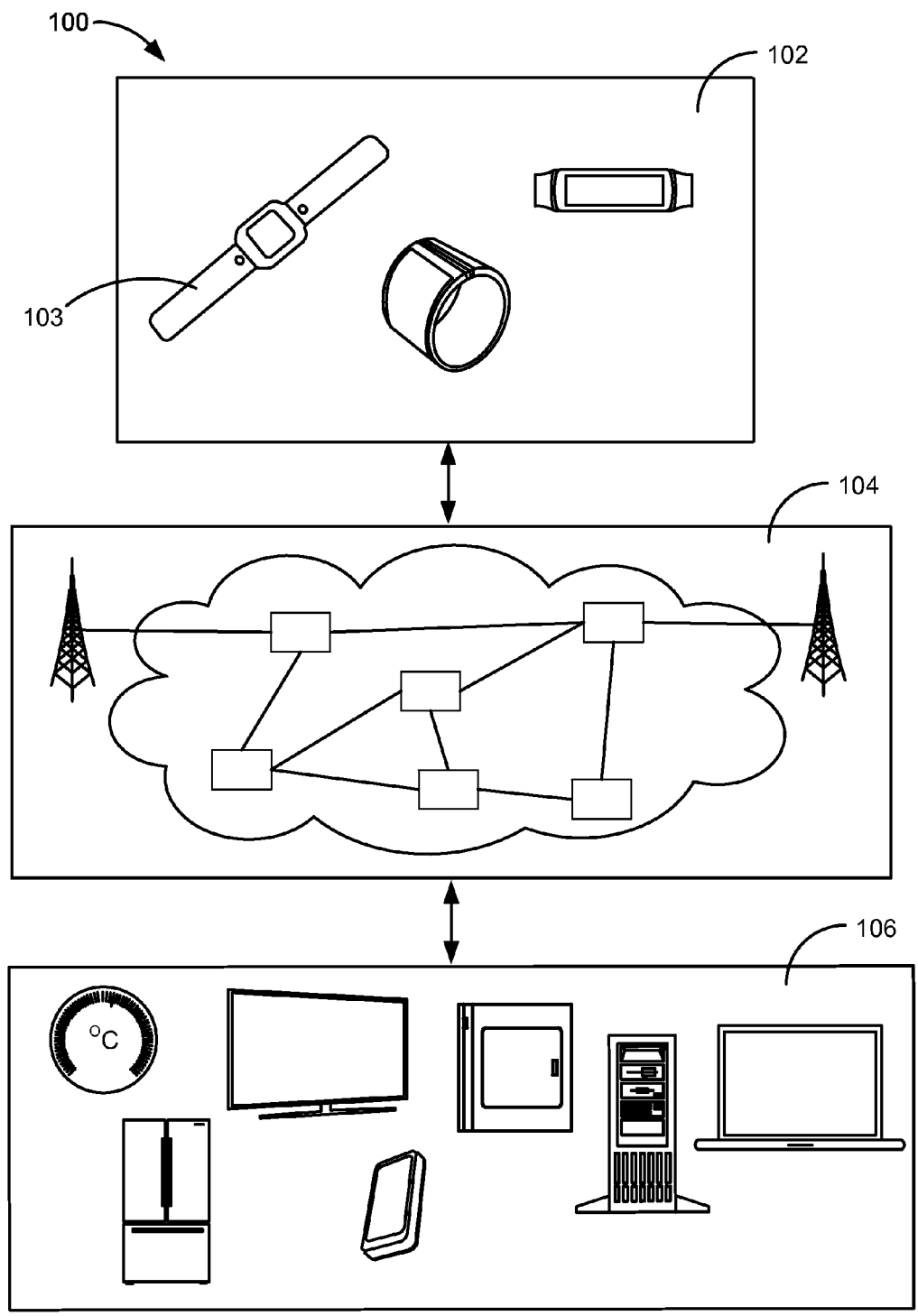
FIG. 1 is an electronic system with a transformable mode mechanism in an embodiment of the present invention.

The following embodiments of the present invention provide a client device configured to be arranged in different physical configurations including a resting configuration, a remote configuration, a wearable configuration, and handle configuration. The client device can also determine its device location relative to a target device for connecting to the client device.

An embodiment of the present invention can also generate an operational mode of the client device including a gesture mode, a monitor mode, a game mode, or a combination thereof based on the physical configuration of the client device, the device proximity of the client device to the target device. The client device can also communicate an input signal to the target device for interacting with the target device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with a transformable mode mechanism in an embodiment of the present invention. The electronic system 100 includes a first device 102, such as a client device, connected to a second device 106, such as a client device or server. The first device 102 can communicate with the second device 106 with a communication path 104, such as a wireless or wired network.

For example, the first device 102 can be any of a variety of wearable devices, such as a watch, a health monitor, a fitness band, an electronic bracelet, a head-mounted device, a remote device, an electronic accessory, or a combination thereof. The first device 102 can be a standalone device or can be incorporated with a mobile device, an entertainment device, an article of clothing, an accessory, an adhesive device, a multi-functional device, or a combination thereof. The first device 102 can couple to the communication path 104 to communicate with the second device 106.

As shown in FIG. 1, the first device 102 can include a fastening unit 103. The fastening unit 103 is configured to secure the first device 102 to a user of the electronic system 100. For example, the fastening unit 103 can include a strap, a band, a clasp, a latch, a tie, a ring, or a combination thereof. As a more specific example, the fastening unit 103 can include a watch strap, a bracelet clasp, an armband, a headband, a ring band, or a combination thereof.

The fastening unit 103 can be constructed of a variety of materials. For example, the fastening unit 103 can be constructed of a polymeric material, an elastomeric material, a metallic material, a fabric, or a combination thereof. As will be discussed in the sections that follow, the fastening unit 103 can embed a plurality of sensors for determining a configuration of the first device 102.

The second device 106 can be a mobile device or a non-mobile device. For example, the second device 10 can be any of a variety of mobile devices, such as a smartphone, a tablet device, a cellular phone, a personal digital assistant, a notebook computer, a netbook computer, a thin client device, a multi-functional mobile communication or entertainment device, or a combination thereof.

The second device 106 can also be a non-mobile device such as a computing device, an appliance, an internet of things (IoT) device, or a combination thereof. The second device 106 can be any of a variety of centralized or decentralized computing devices. For example, the second device 106 can be a desktop computer, a grid computing resource, a server, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server.

The second device 106 can also be an appliance including a living room appliance, a kitchen appliance, a bathroom appliance, a bedroom appliance, or a combination thereof. For example, the second device 10 can include a television, a video device, an audio device, a clock, a lighting unit, a home entertainment system, a washing machine, a refrigerator, an oven, a microwave, a gaming console, or a combination thereof. In addition, the second device 106 can include a thermostat, an alarm system, a heating unit, a cooling unit, an electronic door lock, a garage door opener, a power generation system, or a combination thereof.

For illustrative purposes, the electronic system 100 is described with the first device 102 as a wearable device, although it is understood that the second device 106 can also be a wearable device. The second device 106 can have a means for coupling with the communication path 104 to communicate with the first device 102.

Also for illustrative purposes, the electronic system 100 is shown with the second device 106 and the first device 102 as end points of the communication path 104, although it is understood that the electronic system 100 can have a different partition between the first device 102, the second device 106, and the communication path 104.

For example, the first device 102, the second device 106, or a combination thereof can also function as part of the communication path 104. As a more specific example, the first device 102 can be a watch-type device and the second device 106 can be a server. In this example, the first device 102 can connect directly to the second device 106 through the communication path 104. As an additional example, the first device 102 representing the watch-type device can connect to the server through another instance of the second device 106 such as a smartphone, a notebook, a desktop computer, or a combination thereof.

The communication path 104 can be a variety of networks or communication mediums. For example, the communication path 104 can include wireless communication, wired communication, optical communication, ultrasonic communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Fluid mediums including gases, liquid, or solids can be examples of communication medium for ultrasonic or other high frequency acoustic communication. An example of a fluid medium is air molecules capable of being displaced by a mechanical wave such as a compression wave.

Further, the communication path 104 can traverse a number of network topologies and distances. For example, the communication path 104 can include a direct connection, personal area network (PAN), local area network (LAN), metropolitan area network (MAN), wide area network (WAN) or any combination thereof.

Figure 2:
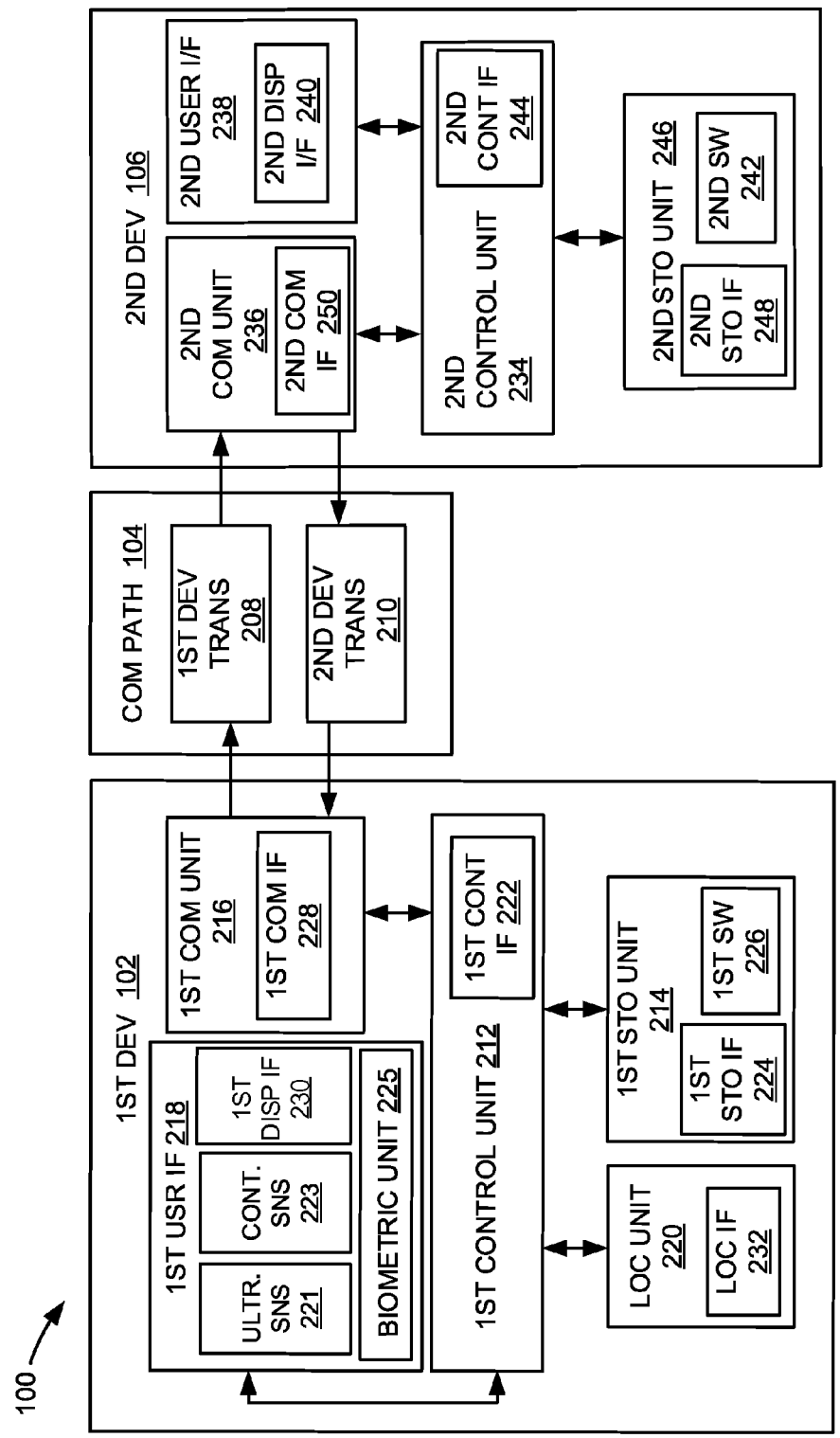
FIG. 2 is an exemplary block diagram of the electronic system.

Referring now to FIG. 2 therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a relay device.

Also for illustrative purposes, the electronic system 100 is shown with the second device 106 as a mobile device, a computing device, an appliance, or a combination thereof, although it is understood that the electronic system 100 can have the second device 106 as a different type of device.

For brevity of description in this embodiment of the present invention, the first device 102 will be described as a client device and the second device 106 will be described as a mobile device, a computing device, an appliance, or a combination thereof. Embodiments of the present invention are not limited to this selection for the type of devices. The selection is an example of the embodiments of the present invention.

The first device 102 can include a first control unit 212, a first storage unit 214, a first communication unit 216, a first user interface 218, and a location unit 220. The first control unit 212 can include a first control interface 222. The first control unit 212 can execute a first software 226 to provide the intelligence of the electronic system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The location unit 220 can generate a location information, a heading, and a speed of the first device 102, as examples. The location unit 220 can be implemented in many ways. For example, the location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The location unit 220 can include a location interface 232. The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as nonvolatile random access memory (NVRAM), Flash memory, disk storage, or a volatile storage such as static random access memory (SRAM).

The first storage unit 214 can include a first storage interface 224. The first storage interface 224 can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a notebook computer, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, an ultrasonic sensor 221, a contact sensor 223, a biometric unit 225, or any combination thereof to provide data and communication inputs.

The ultrasonic sensor 221 is configured to generate a high frequency acoustic wave and evaluate a reflected acoustic wave received by the sensor. For example, the ultrasonic sensor 221 can generate an ultrasound wave such as an acoustic wave with a frequency above approximately 20 kHz and receive an echo as a result of the ultrasound wave encountering an obstacle in the direction of travel. In this example, the obstacle can be an appendage of a person such as a hand, a wall, another device, or a combination thereof.

The ultrasonic sensor 221 can be implemented in many ways. For example, the ultrasonic sensor 221 can be implemented as an ultrasonic integrated circuit, an ultrasonic transceiver, an ultrasonic transducer, an acoustic resonator, a piezoelectric transducer, or a combination thereof. For illustrative purposes, the ultrasonic sensor 221 is shown as being embedded in the first device 102. However, it is understood that the ultrasonic sensor 221 can operate on the periphery or outside of the first device 102. For example, one or more instances of the ultrasonic sensor 221 can be embedded in the fastening unit 103 of the first device 102.

The contact sensor 223 is configured to detect a physical interaction or physical contact with an object or a person. For example, the contact sensor 223 is configured to detect a physical interaction or physical contact with an operator of the first device 102, another component of the first device 102, a component of another device, or a combination thereof. As a more specific example, the contact sensor 223 can detect a physical contact between the first device 102 and the skin of a user of the first device 102.

As an additional example, the contact sensor 223 can detect a physical contact between one portion of the first device 102 and another portion of the first device 102. In addition, the contact sensor 223 can detect a physical contact between one instance of the fastening unit 103 of the first device 102 and another instance of the fastening unit 103 of the first device 102.

The contact sensor 223 can be implemented in a variety of ways. For example, the contact sensor 223 can be implemented as a capacitive sensor including a plurality of capacitive cells and conductor plates, a resistive sensor, a piezoelectric sensor including a piezoresistive sensor or a piezocapacitive sensor, an acoustic sensor including a surface acoustic wave sensor, an array of transducers or actuators, a pressure sensor, an array of infrared sensors, a MEMS sensor, or a combination thereof. In addition, the contact sensor 223 can be integrated into the first device 102 as wireline circuitry, wireless circuitry, an integrated circuit, a chipset, or a combination thereof.

For illustrative purposes, the contact sensor 223 is shown as being embedded in the first device 102. However, it is understood that the contact sensor 223 can operate on the periphery or outside of the first device 102. For example, one or more instances of the contact sensor 223 can be embedded in the fastening unit 103 of the first device 102. In this example, the contact sensor 223 can detect when one instance of the fastening unit 103 physically contacts another instance of the fastening unit 103.

As an additional example, the contact sensor 223 can also detect when one instance of the fastening unit 103 physically contacts another component of the first device 102 such as the first display interface 230. As yet another example, when the first device 103 is implemented as a wearable device, one or more instances of the contact sensor 223 can detect when a surface of the first device 102 contacts a skin surface of the wearer of the first device 103.

The biometric unit 225 is configured to identify a user of the first device 102 through a biometric marker including a fingerprint, a heart rate, or a combination thereof. For example, the biometric unit 225 can identify a user of the first device 102 by comparing the fingerprint of the user obtained using a component of the biometric unit 225 against a stored instance of the fingerprint. In addition, the biometric unit 225 can identify a user of the first device 102 by comparing a heart rate of the user obtained using a component of the biometric unit 225 against a stored instance of the heart rate.

The biometric unit 225 can be implemented in a number of ways. For example, the biometric unit 225 can include a fingerprint scanner, a heart rate monitor, or a combination thereof. As a more specific example, the biometric unit 225 representing the fingerprint scanner can be implemented as a capacitive fingerprint scanner, an optical fingerprint scanner including an infrared fingerprint scanner, or a combination thereof. In addition, the biometric unit 225 representing the heart rate monitor can be implemented as an optical heart rate monitor, a capacitive heart rate monitor, a conductive heart rate monitor, or a combination thereof.

For illustrative purposes, the biometric unit 225 is shown as separate from the contact sensor 223 and the first display interface 230, however, it should be understood that the biometric unit 225 can encompass any number of components of the first user interface 218 including image capture units, a portion of the contact sensor 223, a portion of the first display interface 230, capacitive surfaces, resistive surfaces, or a combination thereof.

In addition, while the biometric unit 225 is shown as being embedded in the first device 102, it should be understood that the biometric unit 225 can operate on the periphery or outside of the first device 102. For example, one or more instances of the biometric unit 225 can be embedded in the fastening unit 103 of the first device 102.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100, including receiving location information from the location unit 220. The first control unit 212 can further execute the first software 226 for interaction with the communication path 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows the user to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the location unit 220 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 220, although it is understood that the second device 106 can also operate the location unit 220.

Figure 3:
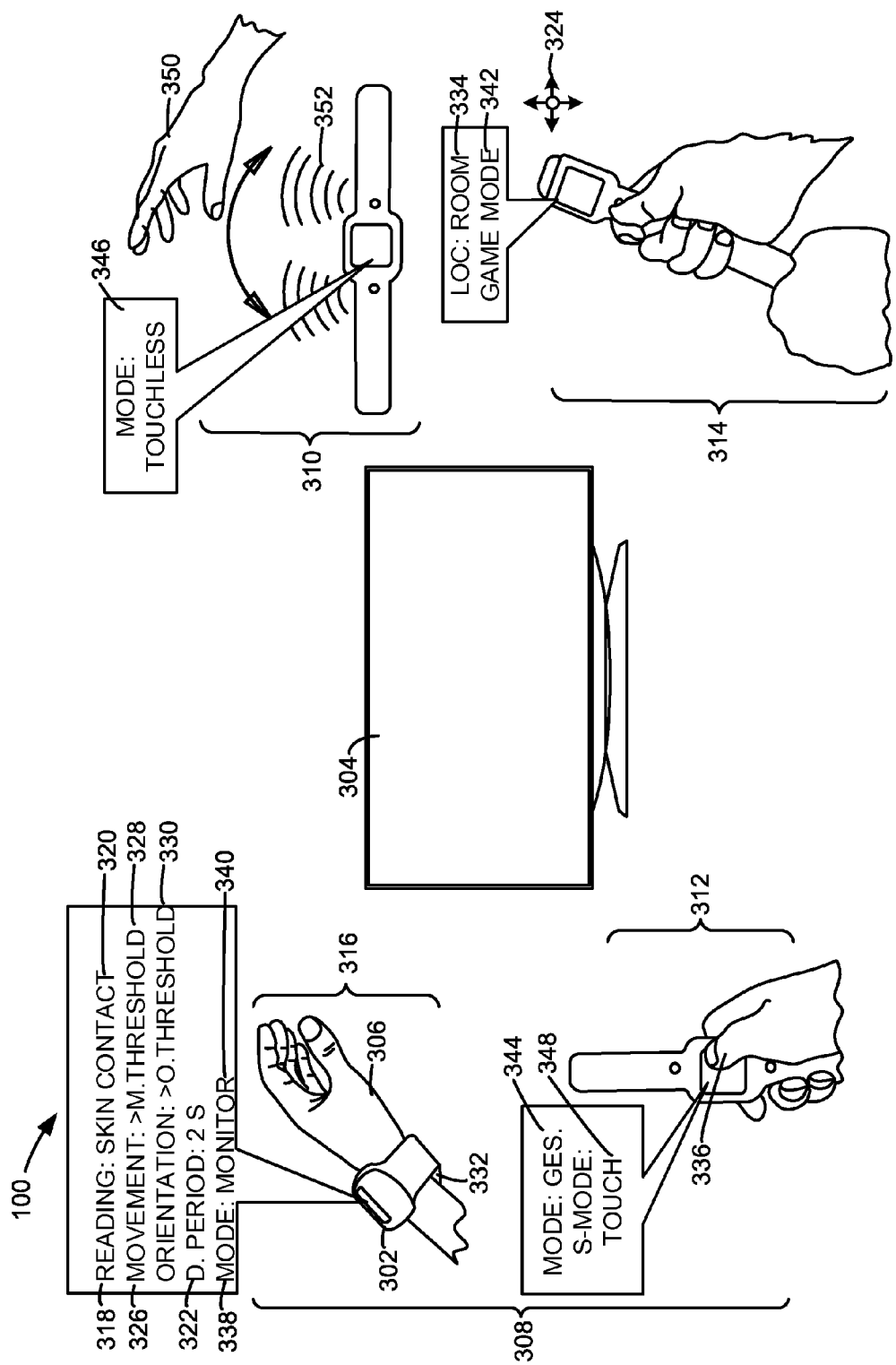
FIG. 3 depicts exemplary configurations of a client device of the electronic system.

Referring now to FIG. 3, therein is shown exemplary configurations of a client device 302 of the electronic system 100. For clarity and brevity, the discussion of an embodiment of the electronic system 100 will be described with the client device 302 representing the first device 102 of FIG. 1, the second device 106 of FIG. 1, or a combination thereof. Additionally, the electronic system 100 can also include a target device 304 representing the second device 106. The client device 302 can communicate with the target device 304, another instance of the client device 302, or a combination thereof through the communication path 104 of FIG. 1 or a portion therein.

The client device 302 is an electronic device connecting or requesting a connection with the target device 304. For example, the client device 302 can connect with the target device 304 by sending information or instructions to the target device 304. As a more specific example, the client device 302 can send the information or instructions to the target device 304 through the communication path 104.

The client device 302 can be worn by a user 306 of the electronic system 100. For example, the client device 302 can be implemented as a watch-type device and the client device 302 can be worn on the wrist of the user 306. As an additional example, the client device 302 can be implemented as an armband or a portion therein and the client device 302 can be worn around the arm of the user 306.

The target device 304 can be an electronic device or system for providing a service to the user 306. The target device 304 can connect with the client device 302 by sending information or instructions to the client device 302 through the communication path 104. For example, the target device 304 can include a television, a video device, an audio device, a clock or other time keeping device, a lighting unit, a home entertainment system, a washing machine, a refrigerator, an oven, a microwave, a gaming console, or a combination thereof.

The client device 302 can be arranged in a physical configuration 308. The physical configuration 308 is a shape or arrangement of the client device 302. The physical configuration 308 can include a wearable configuration 316, a handle configuration 314, a remote configuration 312, a resting configuration 310, or a combination thereof.

The wearable configuration 316 is shape or arrangement of the client device 302 configured to secure the client device 302 to the user 306. For example, the wearable configuration 316 can include a shape or arrangement of the client device 302 configured to be worn by the user 306. As a more specific example, the wearable configuration 316 can include the fastening unit 103 of the client device 302 in a closed or clasped position.

As will be discussed in more detail in the sections below, the electronic system 100 can detect that the client device 302 is in the wearable configuration 316 based on a sensor reading 318. The sensor reading 318 is an output or resulting signal associated with a sensor of the client device 302. For example the sensor reading 318 can include a contact reading 320. The contact reading 320 is an instance of the sensor reading 318 associated with the contact sensor 223. As a more specific example, the contact reading 320 can include an output or resulting signal from a capacitive sensor, a resistive sensor, a piezoelectric sensor, or a combination thereof.

As an additional example, one or more instances of the contact sensor 223 can detect the contact reading 320 between the user 306 and a ventral surface 332 of the client device 302. The ventral surface 332 can include a surface of the client device 302 configured to opposite a dorsal surface. For example, the client device 302 can be implemented as a watch-type device and the ventral surface 332 of the client device 302 can include the side of the watch-type device making contact with the wrist of the user 306.

The electronic system 100 can detect the sensor reading 318 within a detection period 322. The detection period 322 can be a time period established by the electronic system 100 for gauging a result from a sensor of a device in the electronic system 100. The detection period 322 can be adjusted based on the sensor used. For example, the detection period 322 can range from less than 1 microsecond to more than 10 seconds depending on the sensor used.

The electronic system 100 can also detect the physical configuration 308 of the client device 302 based on a device orientation 324, a device movement 326, or a combination thereof. The device orientation 324 is a spatial positioning of a device in the electronic system 100. For example, the electronic system 100 can detect a change in the device orientation 324 corresponding with a change in a pitch, a roll, or a yaw of the client device 302. The device movement 326 is a change in a device location 334. The device location 334 refers to a geographic position of a device in the electronic system 100. For example, the device location 334 can refer to an absolute position such as a geographic coordinate or a relative position with respect to another device in the electronic system 100.

The electronic system 100 can detect a change in the device orientation 324, the device movement 326, or a combination thereof using the location unit 220. The electronic system 100 can also detect whether the device movement 326 of the client device 302 has exceeded a movement threshold 328. The movement threshold 328 is an instance of the device movement 326 representing a minimum or maximum distance. For example, the movement threshold 328 can be any instance of the device movement 326 above 1 meter. As an additional example, the movement threshold 328 can be any instance of the device movement 326 above 10 meters.

The electronic system 100 can also detect whether a change in the device orientation 324 of the client device 302 has exceeded an orientation threshold 330. The orientation threshold 330 is a change in the device orientation 324 representing a minimum or maximum change. For example, the orientation threshold 330 can be implemented as a degree change. As a more specific example, the orientation threshold 330 can be change in any of the yaw, the pitch, or the roll of the client device 302 by more than 5 degrees.

The handle configuration 314 is a shape or arrangement of the client device 302 resembling a wand or baton. The client device 302 can be in the handle configuration 314 when the user 306 holds the fastening unit 103 of the client device 302 in one or both hands of the user 306. The electronic system 100 can detect the client device 302 as being in the handle configuration 314 based on the contact reading 320 from sensors embedded in the fastening unit 103. As will be discussed in the sections that follow, the electronic system 100 can detect the client device 302 as being in the handle configuration 314 based on the device orientation 324, the device movement 326, or a combination thereof.

The remote configuration 312 is a shape or arrangement of the client device 302 configured to receive an input from the user 306 while the user 306 holds the client device 302. For example, the client device 302 can be in the remote configuration 312 when the user 306 holds the fastening unit 103 of the client device 302 and applies a tap input or click input to a display interface of the client device 302 such as the first display interface 230. As an additional example, the client device 302 can be in the remote configuration 312 when the user 306 holds a device body of the client device 302, such as a watch housing, and applies a scroll input to the first display interface 230.

The resting configuration 310 is a shape or arrangement of the client device 302 configured to support a stable or stationary positioning or orientation of the device. For example, the resting configuration 310 can include the fastening unit 103 of the client device 302 in an open or unclasped position with the client device 302 situated on a tabletop. In this example, the ventral surface 332 of the client device 302 can contact a surface of the tabletop with the watch-face of the client device 302 facing upward.

The client device 302 can also generate an operational mode 338 while in an instance of the physical configuration 308. The operational mode 338 is a functional setting of the client device 302 for interacting with the user 306 of the electronic system 100, the target device 304, or a combination thereof. For example, the operational mode 338 can include the monitor mode 340, the game mode 342, the gesture mode 344, or a combination thereof.

The monitor mode 340 is an instance of the operational mode 338 for monitoring a vital sign or physical attribute of the user 306. For example, the monitor mode 340 can include the electronic system 100 activating or enabling certain sensors of the client device 302 including the biometric unit 225. As an additional example, the electronic system 100 can also closely track or record the device orientation 324, the device movement 326, or a combination thereof of the client device 302 while the device operates in the monitor mode 338.

The game mode 342 is an instance of the operational mode 338 for interacting with a gaming application or gaming program. For example, the user 306 can hold the client device 302 in the handle configuration 314 and manipulate the client device 302 as a game controller or joystick. As an additional example, when the client device 302 is in the game mode 342, the electronic system 100 can closely track or record the device orientation 324, the device movement 326, or a combination thereof of the client device 302. As will be discussed in the sections below, the client device 302 can connect with an instance of the target device 304 having a displaying interface, such as the second display interface 240, to allow the user 306 to view an action or motion associated with the gaming application on the display interface of the target device 304.

The gesture mode 344 is an instance of the operational mode 338 for receiving a gesture input from the user 306. For example, the gesture mode 344 can include a touch mode 348, a touchless mode 346, or a combination thereof. The touch mode 348 is an instance of the gesture mode 344 for receiving a touch gesture 336 from the user 306. The touch gesture 336 is a gesture involving the user 306 making physical contact with the client device 302. For example, the touch gesture 336 can include a finger swipe applied to the first display interface 230. In addition, the touch gesture 336 can include a tap gesture applied to a portion of the fastening unit 103 of the client device 302.

The touchless mode 346 is an instance of the gesture mode 344 for receiving a touchless gesture 350 from the user 306. The touchless gesture 350 is a gesture not involving the user 306 making physical contact with the client device 302. For example, the touchless gesture 350 can be a hand waving motion detected by the client device 302. In addition, the touchless gesture 350 can be a page turning motion detected by the client device 302.

The client device 302 can detect the touchless gesture 350 with the ultrasonic sensor 221, an image capture unit, an infrared sensor, or a combination thereof. For example, the client device 302 can detect the touchless gesture 350 with the ultrasonic sensor 221 by emitting an acoustic signal 352. The acoustic signal 352 can include an ultrasound wave with a frequency above approximately 20 kHz, as an example. In this example, the client device 302 can detect the touchless gesture 350 by detecting an echo when the acoustic signal 352 encounters an obstacle in its direction of travel such as a hand or another body part of the user 306.

Figure 4:
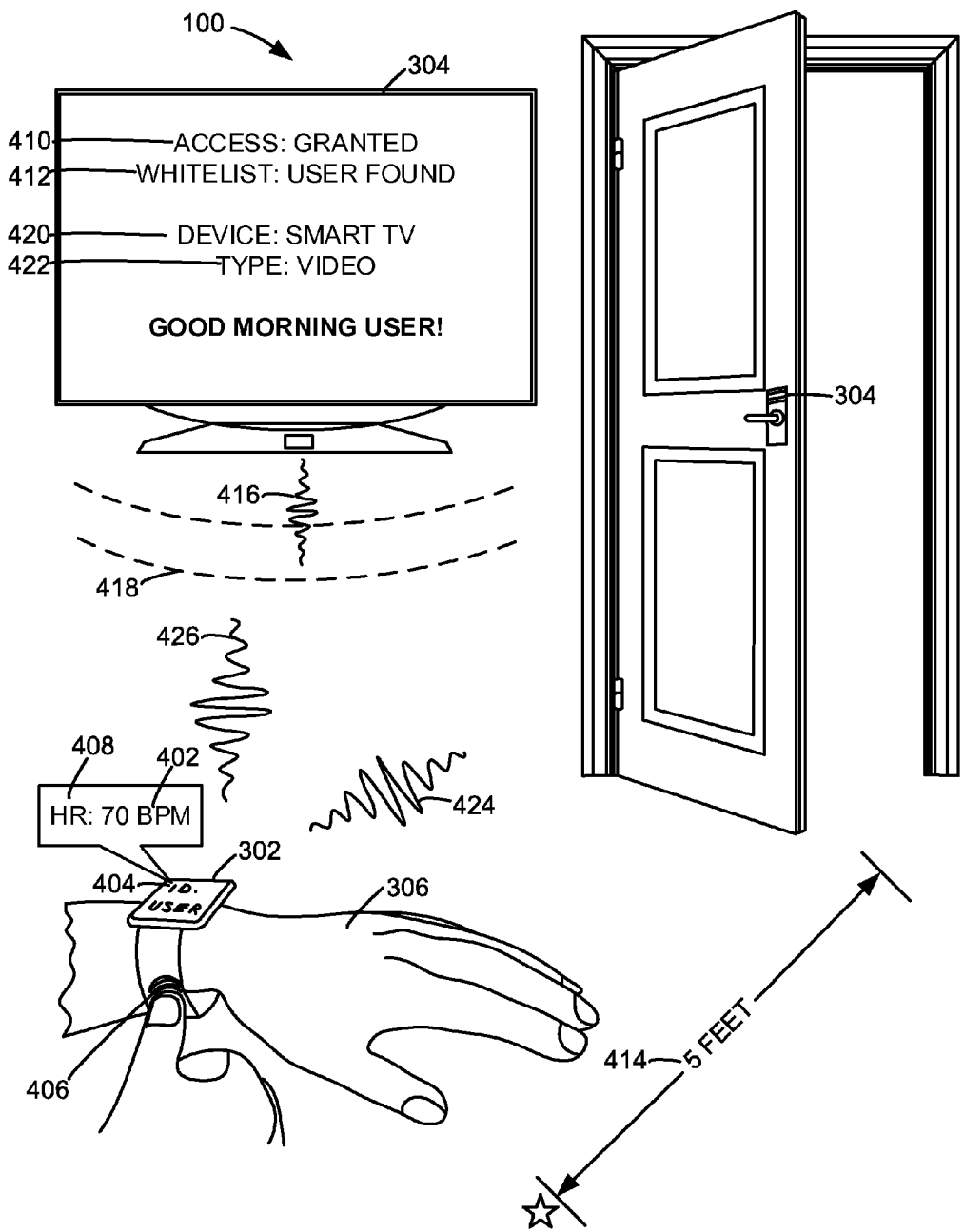
FIG. 4 is an example diagram of the electronic system in operation.

Referring now to FIG. 4, therein is shown an example diagram of the electronic system 100 obtaining a biometric signature 402. The biometric signature 402 is an identifier associated with a vital sign or a physical attribute of the user 306. For example, the biometric signature 402 can include a fingerprint 406, a heart rate 408, or a combination thereof of the user 306. The electronic system 100 can use the biometric signature 402 to confirm an identity 404 of the user 306 for accessing the target device 304.

The electronic system 100 can also use the identity 404 of the user 306 to determine an accessibility 410 of the target device 304 to the user 306 of the client device 302. The accessibility 410 of the target device 304 refers to whether the client device 302 is capable of connecting or communicating with the client device 302. As will be discussed in the sections below, the accessibility 410 of the target device 304 to the client device 302 can be determined based on the physical configuration 308 of the client device 302.

The electronic system 100 can also determine the accessibility 410 of the target device 304 based on an access list 412. The access list 412 is a grouping of multiple instances of the identity 404 for permission to connect to or communicate with the target device 304. For example, the access list 412 can be implemented as a whitelist, a blacklist, or a combination thereof. The access list 412 can be stored in the first storage unit 214, the second storage unit 246, or a combination thereof.

FIG. 4 also depicts a device proximity 414 between the client device 302 and the target device 304. The device proximity 414 refers to a distance between the client device 302 and the target device 304. The device proximity 414 of the client device 302 to the target device 304 can be determined using a beacon signal 416. The beacon signal 416 is an electromagnetic or acoustic transmission for determining a relative geographic position of a device. For example, the beacon signal 416 can be emitted by the target device 304 to determine the device proximity 414 of the client device 302 to the target device 304. The beacon signal 416 can be implemented as a Bluetooth™ signal such as a Bluetooth™ Low Energy (BLE) signal, a WiFi signal, an acoustic signal, an infrared signal, or a combination thereof.

The target device 304 can emit the beacon signal 416 in a signal range 418. The signal range 418 is a maximum geographic area covered by the beacon signal 416. For example, the signal range 418 can range from 0.5 meters to 100 meters.

The beacon signal 416 can carry information including a device identification 420, a device type 422, or a combination thereof. The device identification 420 can be information concerning the name of a device, the model number of the device, the specifications of the device, or a combination thereof. The device type 422 can be information concerning a category or classification of a device or system. For example, the device type 422 can include an audio device, a video type, a computing device, a kitchen appliance, a home appliance, an occupancy system, or a combination thereof.

As depicted in FIG. 4, the client device 302 can gain access to the target device 304 by transmitting an unlock signal 424, a wake-up signal 426, or a combination thereof. The unlock signal 424 is a transmission for changing a state of the target device 304 from a locked state to an unlocked state. For example, the transmission can be an electromagnetic transmission or an acoustic transmission. As a more specific example, the unlock signal 424 can be a wireless signal configured to unlock a display interface of the target device 304. As an additional example, the unlock signal 424 can be an acoustic signal for unlocking an electronic door lock.

The wake-up signal 426 is a transmission for changing a state of the target device 304 from an inactive or sleep state to an active or wake state. For example, the transmission can be an electromagnetic transmission, an optical transmission, an acoustic transmission, or a combination thereof. As a more specific example, the wake-up signal 426 can be an infrared signal configured to invoke an event call, an operating system (OS) call, or an application programming interface (API) call for changing the state of the target device 304 from the inactive or sleep state or the active or wake state. The unlock signal 424, the wake-up signal 426, or a combination thereof can be transmitted through the communication path 104 of FIG. 1.

Figure 5:
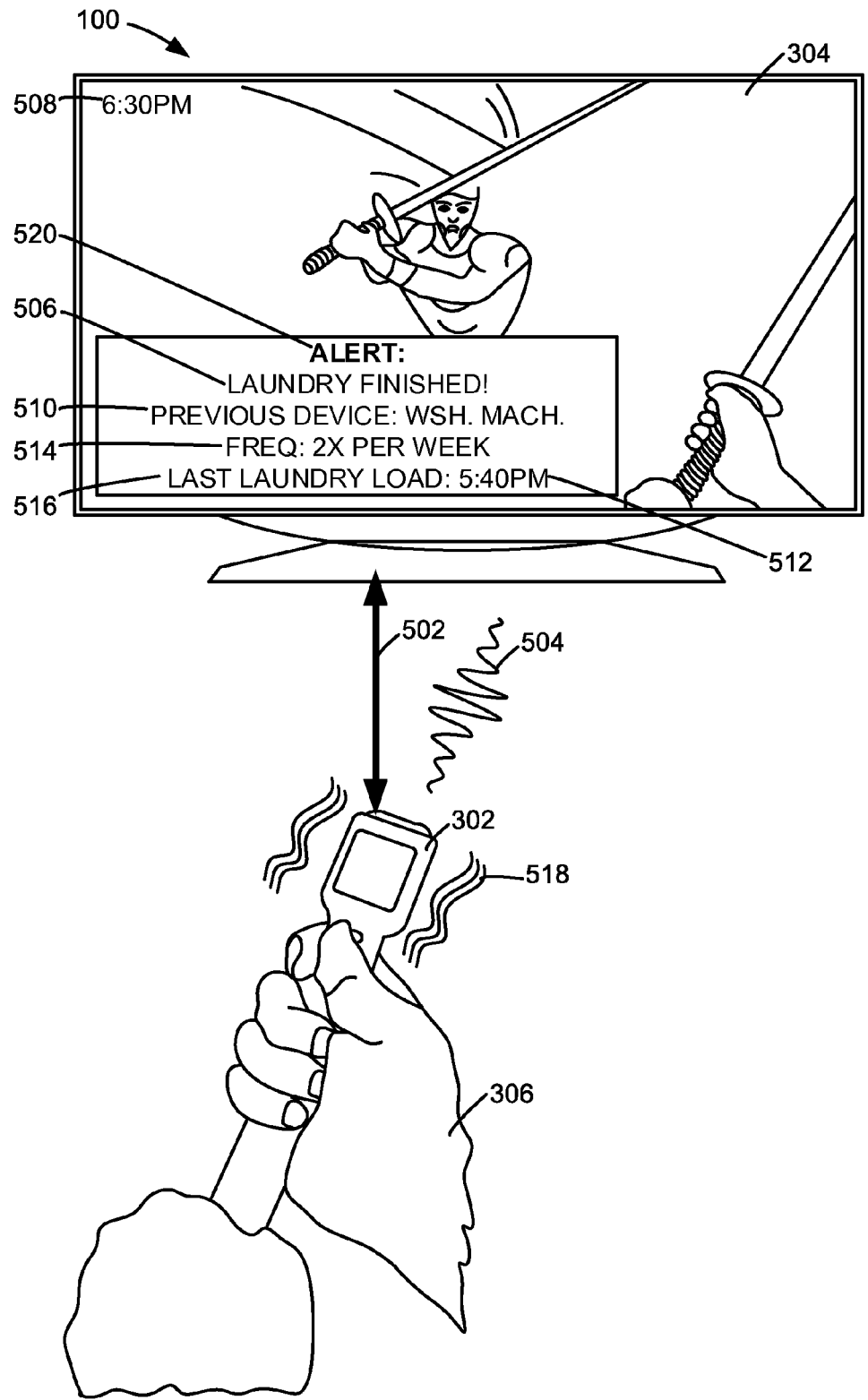
FIG. 5 is another example diagram of the electronic system in operation.

Referring now to FIG. 5, therein is shown an example diagram of the client device 302 of the electronic system 100 in the handle configuration 314 of FIG. 3. As can be seen in FIG. 5, a watch-type device representing the client device 302 can be connected to a television representing the target device 304 through a target connection 502. The target connection 502 is a communication link established between the client device 302 and the target device 304. For example, the target connection 502 can include a backhaul communication link, a secured communication link, an unsecured communication link, an in-band radio frequency link, an out-of-band radio frequency link, or a combination thereof.

Once the target connection 502 is established, the client device 302 can send an input signal 504 to the target device 304 for instructing the target device 304 or manipulating a graphical user interface displayed on the target device 304. For example, as seen in FIG. 5, the client device 302 can be in the game mode 342 of FIG. 3 while the user 306 holds the client device 302 in the handle configuration 314. The client device 302 can send an instance of the input signal 504 to the target device 304 when the user 306 undertakes a swinging gesture while holding the client device 302 in the handle configuration 314. The input signal 504 can be represented on the display interface of the target device 304 as a sword swing in a virtual gaming environment.

As can be seen in FIG. 5, the target device 304 can also display a personalized content 506. The personalized content 506 can include text, numbers, graphics, or a combination thereof generated specifically for a particular instance of the user 306. The personalized content 506 can be generated based on a usage context 508. The usage context 508 refers to a set of circumstances or conditions surrounding an operation or activity undertaken by the user 306 related to the client device 302. The usage context 508 can include a usage order 510, a usage time 512, a usage frequency 514, or a combination thereof.

The usage order 510 is an instance of the usage context 508 representing a sequence of devices connected to the client device 302. For example, the usage order 510 can show that the client device 302 was connected to a washing machine prior to connecting to a gaming console. The usage time 512 refers to a time during which the client device 302 was connected to another device in the electronic system 100. For example, the usage time 512 can indicate that the client device 302 was connected to the washing machine for 10 minutes beginning at 3:04 pm. The usage frequency 514 refers to how often the client device 302 is connected to other devices in the electronic system 100. For example, the usage frequency 514 can reveal that the client device 302 connects to the washing machine every Saturday afternoon.

The usage context 508 can also include a session information 516 concerning an interaction between the client device 302 and the target device 304. The session information 516 refers to data or metadata concerning the interaction by or between any of the client device 302, the target device 304, or a combination thereof while the target connection 502 is active. For example, the session information 516 can include metadata on when a video content generated by the target device 304 was paused or stopped by the client device 302 before the client device 302 terminated the target connection 502 with the target device 304.

As a more specific example, the user 306 can receive an instance of the personalized content 506 as a pop-up window informing the user 306 of a washing machine representing a previous instance of the target device 304 having finished a task. The electronic system 100 can generate the personalized content 506 based on the usage context 508 of the client device 302. In this example, the usage context 508 can include the usage order 510 indicating the client device 302 having been previously connected to the washing machine and the session information 516 concerning when a washing task was initiated and how much time before the washing task completes.

As can be seen in FIG. 5, the client device 302 can receive a target response 520 from the target device 304. The target response 520 refers to a signal received from the target device 304 in response to an action undertaken with the client device 302. For example, the target response 520 can include a signal received from the target device 304 acknowledging the reception of the input signal 504. As an additional example, the target response 520 can be implemented as a data packet transmitted as part of a communication transmission. Alternatively, the target response 520 can be implemented as an ultrasonic signal such as an acoustic wave having a frequency above approximately 18 kHz.

The client device 302 can generate a haptic feedback 518 upon receiving the target response 520. The haptic feedback 518 refers to a mechanical stimulation generated by or at the client device 302 for informing the user 306 of a response of the client device 302, the target response 520, or a combination thereof. For example, the client device 302 can generate the haptic feedback 518 to alert the user 306 to an instance of the personalized content 506. As an additional example, the client device 302 can generate the haptic feedback 518 to inform the user 306 of an action undertaken by the target device 304 in response to an input received at the client device 302.

Figure 6:
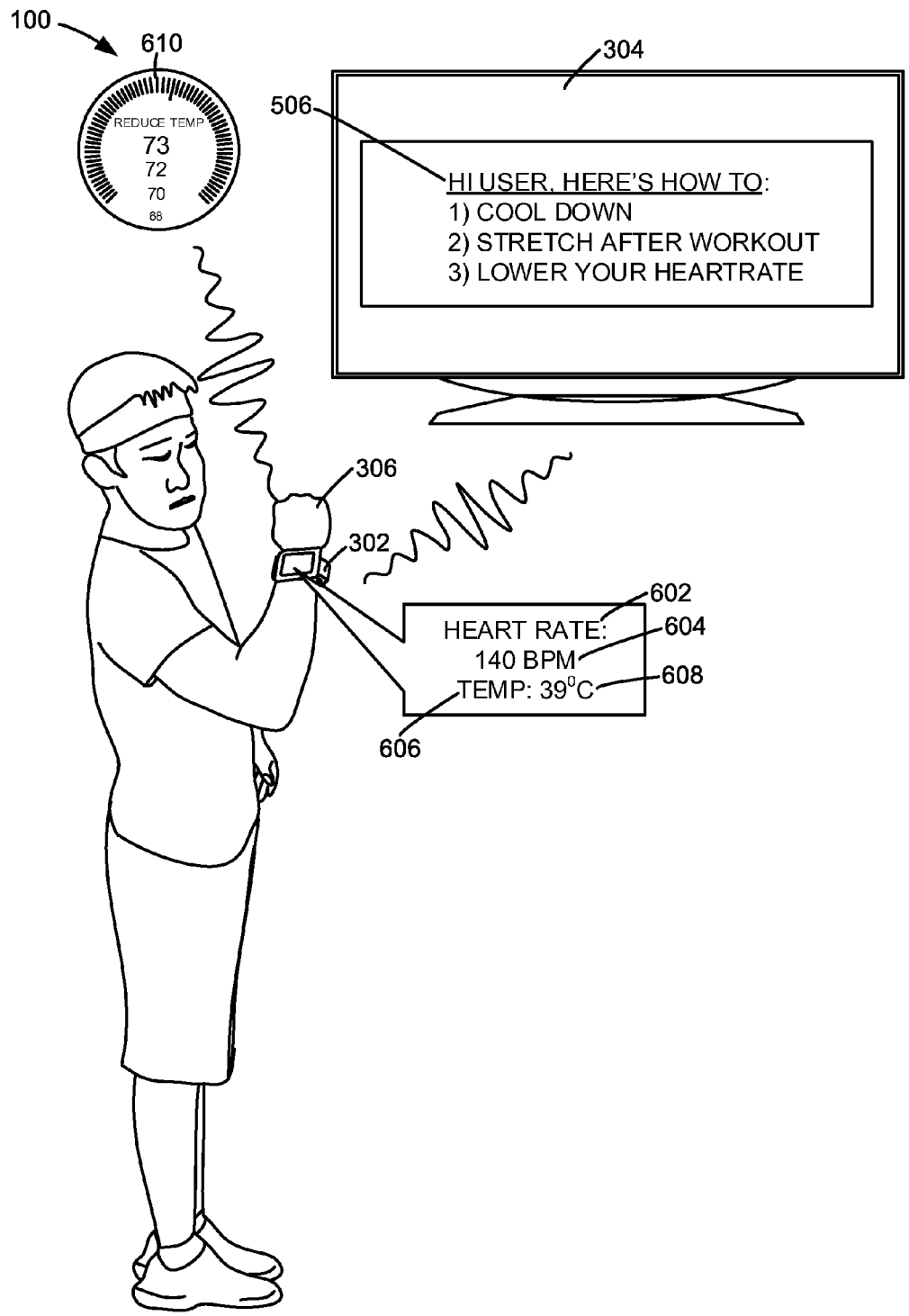
FIG. 6 is yet another example diagram of the electronic system in operation.

Referring now to FIG. 6, therein is shown an example diagram of the client device 302 of the electronic system 100 in the wearable configuration 316 of FIG. 3. The client device 302 can monitor a biometric indicator 602 of the user 306 including the heart rate 408 of FIG. 4, a body temperature 606, or a combination thereof of the user 306. The biometric indicator 602 refers to a vital sign or physical attribute of the user 306.

As will be discussed in the sections below, the client device 302 can monitor the biometric indicator 602 of the user 306 when the client device 302 is operating in the monitor mode 340 in either the handle configuration 314, the wearable configuration 316, or a combination thereof. The client device 302 can monitor the heart rate 408 of the user 306 through a heart rate reading 604. The heart rate reading 604 refers to a set of data or a graph concerning the heart rate 408 of the user 306. The electronic system 100 can generate the heart rate reading 604 by monitoring the heart rate 408 of the user 306 over time. The heart rate reading 604 can include an electrocardiograph reading or an electrocardiogram. The client device 302 can obtain the heart rate reading through the biometric unit 225 of FIG. 2.

The client device 302 can also monitor a body temperature 606 of the user 306. The client device 302 can monitor the body temperature 606 of the user 306 through a temperature reading 608. The temperature reading 608 is a set of data or a graph concerning the body temperature 606 of the user 306. The electronic system 100 can generate the temperature reading 608 by monitoring the body temperature 606 of the user 306 over time.

The electronic system 100 can also generate a target setting 610 based on the biometric indicator 602 of the user 306. The target setting 610 refers to a setting of one or more instances of the target device 304. For example, the target device 304 can be a thermostat and the target setting 610 can be a temperature setting of the thermostat. As can be seen in FIG. 6, the client device 302 can detect elevated instances of both the heart rate 408 and the body temperature 606 of the user 306. The client device 302 can then communicate with a cooling unit, such as an air conditioner, representing the target device 304 to lower a temperature of the cooling unit representing the target setting 610 accommodate the elevated instances of the heart rate 408 and the body temperature 606 of the user 306.

Figure 7:
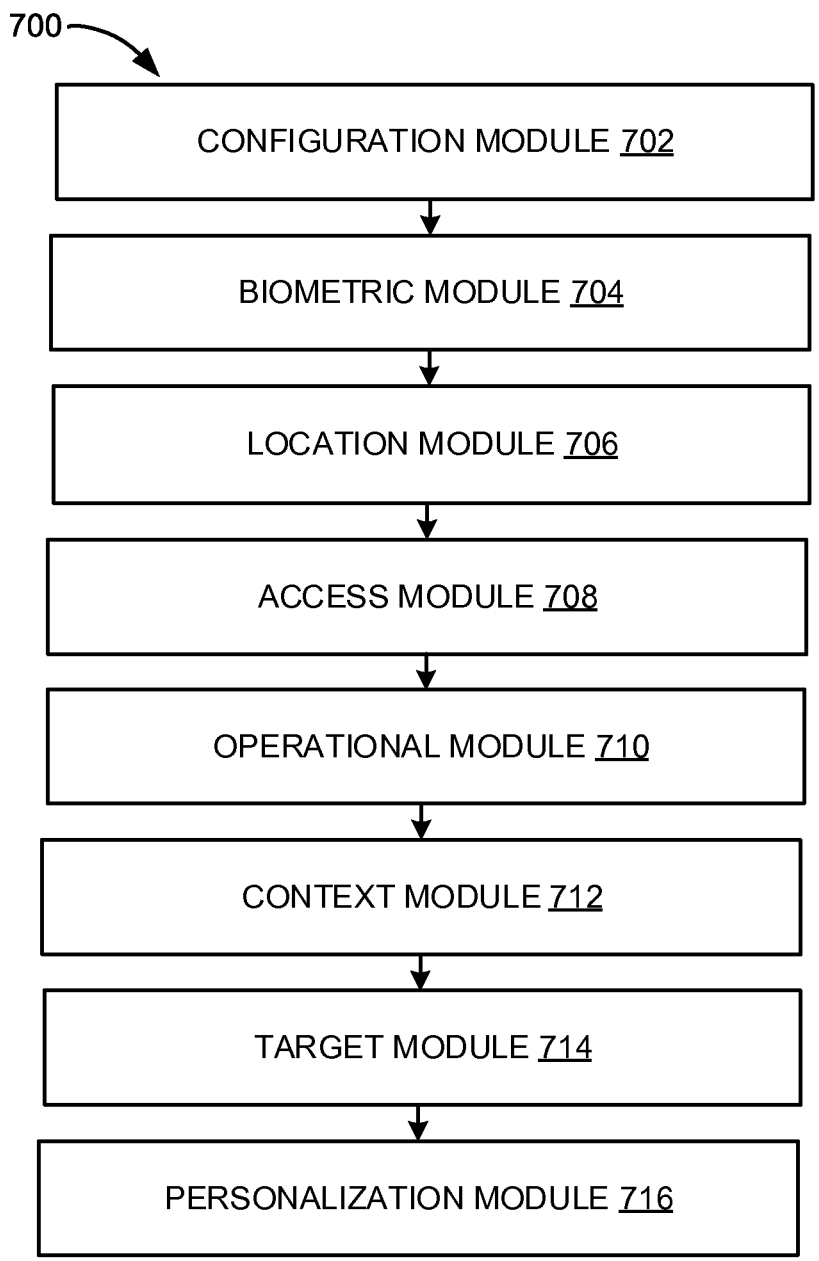
FIG. 7 is a control flow of the electronic system.

Referring now to FIG. 7, therein is shown a control flow 700 of the electronic system 100 of FIG. 1. The electronic system 100 can include a configuration module 702, a biometric module 704, a location module 706, an access module 708, an operational module 710, a context module 712, a target module 714, a personalization module 716, or a combination thereof. The configuration module 702 is configured to determine the physical configuration 308 of FIG. 3 of the client device 302. For example, the configuration module 702 can determine the physical configuration 308 of the client device 302 as the resting configuration 310 of FIG. 3, the remote configuration 312 of FIG. 3, the wearable configuration 316 of FIG. 3, or the handle configuration 314 of FIG. 3.

The configuration module 702 determines the physical configuration 308 of the client device 302 in a number of ways. The configuration module 702 can determine the physical configuration 308 of the client device 302 based on one or more instances of the sensor reading 318 of FIG. 3 within the detection period 322 of FIG. 3. More specifically, the configuration module 702 can determine the physical configuration 308 of the client device 302 based on the contact reading 320 of FIG. 3 from one or more instances of the contact sensor 223 of FIG. 2, the device orientation 324 of FIG. 3 from the gyroscope of the location unit 220 of FIG. 2, the device movement 326 of FIG. 3 from the accelerometer of the location unit 220, or a combination thereof.

For example, the configuration module 702 can make an initial assessment of whether any instances of the contact sensor 223 has detected contact with the user 306. In this example, the configuration module 702 can make the assessment based on a capacitance reading or resistive reading representing physical contact with human skin. If the contact reading 320 does not indicate physical contact with the user 306, the configuration module 702 can exclude the handle configuration 314, the remote configuration 312, and the wearable configuration 316 from consideration as possibilities for the physical configuration 308. In this example, the configuration module 702 can initially determine the physical configuration 308 as the resting configuration 310.

The configuration module 702 can determine the physical configuration 308 of the client device 302 by taking into account the device movement 326, the device orientation 324, or a combination thereof within the detection period 322. For example, the configuration module 702 can determine the physical configuration 308 as the resting configuration 310 when the sensor reading 318 from the accelerometer and the gyroscope indicate no occurrence of the device movement 326 and no change in the device orientation 324, respectively, within the detection period 322.

In the example where the sensor reading 318 shows no change in the device movement 326 or the device orientation 324, the configuration module 702 can determine the physical configuration 308 of the client device 302 as the resting configuration 310 even if an instance of the contact sensor 223 detects physical contact with the user 306 on a portion of the target device 304 other than the first display interface 230. As a more specific example, the configuration module 702 can determine the physical configuration 308 of the client device 302 as the resting configuration 310 when the client device 302 is resting on a table top and the user 306 is not touching the client device 302. As an additional example, the configuration module 702 can also determine the physical configuration 308 of the client device 302 as the resting configuration 310 when the client device 302 is steadily holding the client device 302 but not touching the touchpad or touchscreen of the client device 302.

The configuration module 702 can determine the physical configuration 308 of the client device 302 as the remote configuration 312 based on the device movement 326 and the sensor reading 318. For example, the configuration module 702 can initially determine the physical configuration 308 of the client device 302 as the remote configuration 312 when the sensor reading 318 indicates physical contact by the user 306 with a display interface of the client device 302 within the detection period 322. As a more specific example, the sensor reading 318 can indicate the user 306 applying a touch gesture to a touchpad or a touchscreen of the client device 302.

However, the configuration module 702 can exclude the remote configuration 312 as a possibility for the physical configuration 308 if the physical contact with the display interface is also accompanied by an occurrence of the device movement 326 exceeding an instance of the movement threshold 328 at the time the physical contact is made. For example, the configuration module 702 can exclude the remote configuration 312 as a possibility for the physical configuration 308 if a touch gesture applied by the user 306 to the touchpad of the client device 302 occurs while the client device 302 is being noticeably moved from its original position before the touch gesture was applied. As a more specific example, the movement threshold 328 can be an instance of the device movement 326 representing a distance greater than the longest dimension of the client device 302.

Alternatively, the configuration module 702 can determine the physical configuration 308 as the remote configuration 312 if the physical contact with the display interface is not accompanied by an occurrence of the device movement 326 exceeding an instance of the movement threshold 328. As a more specific example, the configuration module 702 can determine the physical configuration 308 of the client device 302 as the remote configuration 312 when the user 306 holds the client device 302 steady while applying a touch gesture to a touchpad or a touchscreen of the client device 302.

As an additional example, the client device 302 can be implemented as a watch-type device. In this example, the configuration module 702 can determine the physical configuration 308 of the watch-type device as the remote configuration 312 when the user 306 holds the straps of the watch-type device while applying a touch gesture to a display interface of the watch-type device.

The configuration module 702 can determine the physical configuration 308 of the client device 302 as the handle configuration 314 based on the sensor reading 318, the device orientation 324, the device movement 326, or a combination thereof. For example, the configuration module 702 can determine the physical configuration 308 of the client device 302 as the handle configuration 314 when the contact reading 320 indicates physical contact by the user 306 resulting in contact between specific components of the client device 302.

As a more specific example, the configuration module 702 can determine the physical configuration 308 of the client device 302 as the handle configuration 314 when a hand of the user 306 brings together one portion of the fastening unit 103 with another portion of the fastening unit 103. In this example, the client device 302 can be implemented as a watch-type device and the configuration module 702 can determine the physical configuration 308 of the watch-type device as the handle configuration 314 when the hand of the user 306 squeezes together the straps of the watch-type device.

Moreover, the configuration module 702 can also take into account the device movement 326, a change in the device orientation 324, or a combination thereof. For example, the configuration module 702 can determine the physical configuration 308 of the client device 302 as the handle configuration 314 when physical contact with the user 306 is detected along with the device movement 326 exceeding an instance of the movement threshold 328. More specifically, the movement threshold 328 can be a minimum of 10 centimeters and the configuration module 702 can also take into account any change in the device orientation 324 while the client device 302 engages in the device movement 326.

In addition, the configuration module 702 can determine the physical configuration 308 as the handle configuration 314 when the sensor reading 318 indicates physical contact with the user 306 accompanied by an occurrence of the device movement 326 and a change in the device orientation 324 within the detection period 322. As a more specific example, the configuration module 702 can determine the physical configuration 308 of the client device 302 as the handle configuration 314 when the user 306 holds the fastening unit 103 of the client device 302 as a sword or baton while mimicking a swinging motion.

The configuration module 702 can determine the physical configuration 308 of the client device 302 as the wearable configuration 316 based on the sensor reading 318, the device movement 326, the device orientation 324, or a combination thereof. For example, the configuration module 702 can determine physical configuration 308 of the client device 302 as the wearable configuration 316 when the contact reading 320 indicates physical contact with the user 306 and physical contact between components of a latching or securing mechanism of the client device 302.

As a more specific example, the client device 302 can be a watch-type device and the latching or securing mechanism can be magnetic portions of the fastening unit 103 configured to secure two ends of the fastening unit 103 together. As an additional example, the latching or securing mechanism can be a connector mechanism including a male component and a female component. In this latter example, one or more instances of the contact sensor 223 can be embedded in the connector mechanism and the configuration module 702 can identify the closing of the connector mechanism from the contact reading 320.

Additionally, the configuration module 702 can determine the physical configuration 308 as the wearable configuration 316 when the contact reading 320 indicates physical contact between the skin of the user 306 and portions of the ventral surface 332 of FIG. 3 of the client device 302 having the contact sensor 223. For example, the client device 302 can be implemented as a watch-type device and the ventral surface 332 of the watch-type device can include the underside of the watch face as well as the underside of the watch straps. In this example, the configuration module 702 can determine the physical configuration 308 of the watch-type device as the wearable configuration 316 when one or more instances of the contact sensor 223 embedded in the watch straps detects physical contact between the wrist of the user 306 and the watch-type device.

Moreover, the configuration module 702 can take into account the device movement 326 and changes in the device orientation 324. For example, the configuration module 702 can determine the physical configuration 308 as the wearable configuration 316 when physical contact between the ventral surface 332 of the client device 302 and the user 306 is accompanied by the device movement 326 exceeding an instance of the movement threshold 328 or a change in the device orientation 324 within the detection period 322. As a more specific example, the configuration module 702 can determine the physical configuration 308 as the wearable configuration 316 when the user 306 wears the client device 302 by securing the client device 302 on to a body part of the user 306.

The configuration module 702 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to determine the physical configuration 308.

Moreover, the configuration module 702 can also communicate the physical configuration 308 between devices through the first communication unit 216 of FIG. 2, the second communication unit 236 of FIG. 2, or a combination thereof. After determining the physical configuration 308, the control flow can pass from the configuration module 702 to the biometric module 704.

The biometric module 704 is configured to determine the biometric signature 402 of FIG. 4. The biometric module 704 can determine the biometric signature 402 for recognizing the identity 404 of FIG. 4 of the user 306. The biometric module 704 can determine the biometric signature 402 in a variety of ways.

For example, the biometric module 704 can determine the biometric signature 402 representing the fingerprint 406 of FIG. 4 of the user for recognizing the identity 404 of the user 306. The biometric module 704 can determine the biometric signature 402 representing the fingerprint 406 based on the physical configuration 308. As a specific example, the biometric module 704 can automatically determine the fingerprint 406 of the user 306 when the physical configuration 308 of the client device 302 is in the handle configuration 314. As a more specific example, the client device 302 can have one or more instances of the biometric unit 225 including the contact sensor 223 embedded in the fastening unit 103 of the client device 302. In this example, the biometric module 704 can determine the fingerprint 406 of the user 306 based on the contact reading 320 by simply having the user 306 hold the client device 302 by the fastening unit 103 in the handle configuration 314.

As an additional example, the biometric module 704 can also determine the fingerprint 406 of the user 306 when the physical configuration 308 of the client device 302 is in the remote configuration 312, the wearable configuration 316, or a combination thereof. Similar to the example above, the biometric module 704 can determine the fingerprint 406 of the user 306 based on the contact reading 320 when the user 306 makes physical contact with the fastening unit 103 while the client device 302 is in either the remote configuration 312 or the wearable configuration 316. In addition, the biometric module 704 can automatically determine the fingerprint 406 of the user 306 when the user 306 makes physical contact with a portion of the first display interface 230 while the client device 302 is in either the remote configuration 312 or the wearable configuration 316.

As a more specific example, the client device 302 can have one or more instances of the biometric unit 225 including an optical fingerprint scanner, a capacitive fingerprint scanner, or a combination thereof embedded in the first display interface 230. In this example, the biometric module 704 can determine the fingerprint 406 of the user 306 when the user 306 applies the touch gesture 336 of FIG. 3 to the first display interface 230. The biometric module 704 can determine the fingerprint 406 by comparing one or more extracted features of the fingerprint 406 including an arch, a loop, or a whorl against features of a stored instance of the fingerprint 406 of the user 306.

The biometric unit 225 can use a variety of mechanisms to compare the features of the fingerprint 406 with a stored instance of the fingerprint 406 including a pattern-recognition, an image matching, a minutiae comparison, a phase-based matching such as a Fourier phase matching, or a combination thereof. The biometric unit 225 can recognize the identity 404 of the user 306 when a comparison of the fingerprint 406 captured by the client device 302 matches the stored instance of the fingerprint 406 of the user 306.

The biometric module 704 can also determine the biometric signature 402 representing the heart rate 408 of FIG. 4 of the user 306 for recognizing the identity 404 of the user 306. For example, the biometric module 704 can automatically determine the heart rate 408 of the user when the physical configuration 308 of the client device 302 is in the wearable configuration 316. As a more specific example, the client device 302 can have one or more instances of the biometric unit 225 including the optical heart rate monitor, the capacitive heart rate monitor, the conductive heart rate monitor, or a combination thereof embedded in the fastening unit 103 of the client device 302. In this example, the biometric module 704 can determine the heart rate 408 of the user 306 based on the contact reading 320, an image of a portion of the skin closest to the biometric unit 225, or a combination thereof. Also in this example, the biometric module 704 can determine the heart rate 408 of the user 306 by simply having the user 306 wear the client device 302.

As an additional example, the biometric module 704 can also automatically determine the heart rate 408 of the user 306 when the physical configuration 308 is in the handle configuration 314. In this example, the biometric module 704 can determine the heart rate 408 of the user 306 based on the contact reading 320 when the user 306 holds one or more instances of the fastening unit 103 in the hand of the user 306.

The biometric module 704 can also determine the heart rate 408 when the physical configuration 308 of the client device 302 is in the remote configuration 312, the resting configuration 310, or a combination thereof. For example, the biometric module 704 can determine the heart rate 408 of the user 306 when the user 306 physically contacts a portion of the client device 302 including the fastening unit 103, the first display interface 230, or a combination thereof while the client device 302 is in either the resting configuration 310 or the remote configuration 312. In addition, the biometric module 704 can also determine the heart rate 408 of the user 306 when the user 306 places a portion of the skin of the user 306 close to an image capture unit of the biometric unit 225.

The biometric module 704 can determine the heart rate 408 of the user 306 as within an acceptable range for recognizing the identity 404 of the user 306. The biometric module 704 can also determine the heart rate 408 of the user 306 based on an activity level of the user 306. For example, the physical configuration 308 of the client device 302 can be in the wearable configuration 316 and the biometric module 704 can determine the heart rate 408 of the user 306 as between 150 to 160 beats per minute (bpm). The biometric module 704 can determine the heart rate 408 by comparing the heart rate reading 604 of the user 306 against a stored instance of the heart rate reading 604 after accounting for the activity level of the user 306. For example, the biometric module 704 can compare the heart rate reading 604 of the user 306 after a 30 minute jog with a stored instance of the heart rate reading 604 generated after a similar level of activity.

The biometric module 704 can use a variety of algorithms to compare the heart rate reading 604 including an electrocardiograph reading or an electrocardiogram (EKG) of the user. For example, the biometric module 704 can use a signal processing algorithm, a signal comparison algorithm, a signal matching algorithm, a differentiation algorithm, or a combination thereof to determine the heart rate 408 of the user 306. The biometric unit 225 can recognize the identity 404 of the user 306 when a comparison of the heart rate reading 604 matches a stored instance of the heart rate reading 604.

The biometric module 704 is also configured to track the biometric indicator 602 of FIG. 4. As discussed previously, the biometric indicator 602 can include the heart rate 408 of the user 306, the body temperature 606 of FIG. 6 of the user 306, or a combination thereof.

The biometric module 704 can track the heart rate 408 of the user 306 on a continuous basis or a periodic basis. For example, the biometric module 704 can track the heart rate 408 of the user 306 on a periodic basis when the user 306 has the client device 302 in the handle configuration 314. As an additional example, the biometric module 704 can track the heart rate 408 of the user 306 on a continuous basis when the user 306 has the client device 302 in the wearable configuration 316.

The biometric module 704 can also track the biometric indicator 602 representing the body temperature 606 of the user 306. For example, the biometric module 704 can automatically track the temperature reading 608 of FIG. 6 for gauging the body temperature 606 of the user 306 while the client device 302 is in the wearable configuration 316, the handle configuration 314, or a combination thereof. For example, the client device 302 can be a watch-type device and the biometric unit 225 can obtain the temperature reading 608 through a physical contact made by the wrist of the user 306 and the ventral surface 332 of the client device 302.

The biometric module 704 can also track the temperature reading 608 of the user 306 when the client device 302 is in the resting configuration 310, the remote configuration 312, the handle configuration 314, or a combination thereof. For example, the biometric module 704 can track the temperature reading 608 of the user 306 when the user 306 applies an instance of the touch gesture 336 to a portion of the client device 302 including a dorsal or upper surface of the fastening unit 103, the first display interface 230, or a combination thereof.

The biometric module 704 can track the temperature reading 608 of the user 306 using the contact sensor 223. As will be discussed in the sections that follow, the electronic system 100 can generate the personalized content 506 of FIG. 5 based on the biometric indicator 602.

The biometric module 704 can be part of the first software 226, the second software 242, or a combination thereof. The first control unit 212 can execute the first software 226, the second control unit 234 can execute the second software 242, or a combination thereof to determine the biometric signature 402 and track the biometric indicator 602.

Moreover, the biometric module 704 can also communicate the biometric signature 402 and the biometric indicator 602 between devices through the first communication unit 216, the second communication unit 236, or a combination thereof. After determining the biometric signature 402 and tracking the biometric indicator 602, the control flow can pass from the biometric module 704 to the location module 706.

The location module 706 is configured to determine the device location 334 of FIG. 3 of the client device 302. The location module 706 can determine the device location 334 of the client device 302 for establishing the device proximity 414 of FIG. 4 of the client device 302 to the target device 304. The location module 706 can determine the device location 334 of the client device 302 in a number of ways.

The location module 706 can determine the device location 334 of the client device 302 based on locational signals transmitted by the location unit 220 of FIG. 2. For example, the location module 706 can determine a geographic coordinate of the client device 302 by using the GPS component of the location unit 220. In addition, the location module 706 can determine the geographic coordinate of the client device 302 using cellular tower triangulation. Moreover, the location module 706 can also determine the geographic coordinate of one or more instances of the target device 304 when the target device 304 includes a location unit having a GPS component, an antenna, or a combination thereof.

Furthermore, the location module 706 can use both the location unit 220 and the first communication unit 216 to determine the device location 334 of the client device 302 when cellular or GPS signals are inaccessible or low such as within a home, a residence, an office, an indoor structure, an underground structure, or a combination thereof. In this example, the location module 706 can detect the beacon signal 416 of FIG. 4 generated by the target device 304. As indicated previously, the beacon signal 416 can include a Bluetooth™ signal such as a Bluetooth™ Low Energy (BLE) signal, a WiFi signal, an acoustic signal, an infrared signal, or a combination thereof.

The beacon signal 416 can also include information concerning the device identification 420 of FIG. 4, the device type 422 of FIG. 4, the signal range 418 of FIG. 4 or a combination thereof. For example, the target device 304 can emit different instances of the beacon signal 416 each having a different instance of the signal range 418. As a more specific example, the signal range 418 of the beacon signal 416 can extend from 0.5 meters to 100 meters. The location module 706 can determine the device proximity 414 of the client device 302 to the target device 304 based on which instance of the signal range 418 the client device 302 detects.

The location module 706 can also use the beacon signal 416 from multiple instances of the target device 304 to triangulate the device location 334 of the client device 302 and track the device movement 326 within the home, the residence, the office, the indoor structure, the underground structure, or a combination thereof. In addition, the electronic system 100 can also use the beacon signal 416 from multiple instances of the target device 304 to determine the device location 334 of the target device 304 relative to another instance of the target device 304. Furthermore, the location module 706 can determine the device location 334 of the target device 304 based on an input from the user 306, a map, a floor plan, a blueprint, or a combination thereof.

The location module 706 can be part of the first software 226, the second software 242, or a combination thereof. The first control unit 212 can execute the first software 226, the second control unit 234 can execute the second software 242, or a combination thereof to determine the device location 334 of the client device 302 and the device proximity 414 of the client device 302 to the target device 304.

Moreover, the location module 706 can also communicate the device location 334 of the client device 302 between devices through the first communication unit 216, the second communication unit 236, or a combination thereof. After determining the device location 334 of the client device 302, the control flow can pass from the location module 706 to the access module 708.

The access module 708 is configured to determine the accessibility 410 of FIG. 4 of the target device 304 to the client device 302 and to grant the client device 302 access to the target device 304. The access module 708 can determine the accessibility 410 of the target device 304 in a number of ways.

The access module 708 can determine the accessibility 410 of the target device 304 after inferring an intention of the user 306 to access the target device 304. The access module 708 can infer the intention of the user 306 to access the target device 304 based on the physical configuration 308 of the client device 302, the device proximity 414 of the client device 302 to the target device 304, or a combination thereof.

For example, the access module 708 can determine the physical configuration 308 of the client device 302 as the handle configuration 314. The access module 708 can then determine the instances of the target device 304 which can be controlled or commanded by the client device 302 while in the handle configuration 314. The access module 708 can make this determination based on the device type 422, the device identification 420 including the hardware specifications of the target device 304, or a combination thereof. As a more specific example, when the client device 302 is in the handle configuration 314, the access module 708 can determine all instances of the target device 304 having a display interface such as the second display interface 240 in the device proximity 414 of the client device 302.

In this example, the device proximity 414 can be a distance allowing the user 306 visual access to the display interface of the target device 304. As an even more specific example, when the client device 302 is in the handle configuration 314 the access module 708 can scan for all notebooks, desktop computers, or networked televisions within 10 meters of the client device 302.

Similarly, the access module 708 can establish the device proximity 414 as within 10 meters when the client device 302 is in the resting configuration 310. Moreover, the access module 708 can also limit the device type 422 of the target device 304 to those having a display interface.

As an additional example, when the client device 302 is in either the wearable configuration 316 or the remote configuration 312, the access module 708 can expand the device type 422 to include all instances of the target device 304, as well as those without a display interface, and can extend the device proximity 414 of such devices to a further distance. As a more specific example, when the client device 302 is in the wearable configuration 316, the access module 708 can even scan for instances of the target device 304 in a different room or a different section of the building from the target device 304.

Furthermore, the access module 708 can take into account the device orientation 324, the device movement 326, or a combination thereof when the client device 302 is in the wearable configuration 316. For example, the access module 708 can infer the user 306 is not intending to access any instances of the target device 304 when the device movement 326 is detected or the device orientation 324 of the client device 302 changes rapidly within the detection period 322. As a more specific example, the client device 302 can be implemented as a watch-type device and the access module 708 can infer the user 306 is not intending to access any instances of the target device 304 using the client device 302 when the watch face of the device is not facing upwards or toward a positive y-axis direction in a spatial coordinate system.

The access module 708 can also infer the intention of the user 306 to access the target device 304 based on the usage context 508 of FIG. 5. For example, the access module 708 can determine the user 306 intends to access an instance of the target device 304 because the user 306 previously connected to the target device 304 at the same time each day for the past week. Moreover, the access module 708 can determine the user 306 intends to access another instance of the target device 304 as a result of the user 306 using two other instances of the target device 304 of the same device type 422 within a short period of time. The usage context 508 will be discussed in more detail in the sections that follow.

Once the access module 708 has determined the instances of the target device 304 capable of being controlled by the client device 302 based on the physical configuration 308 and the device proximity 414, the access module 708 can determine whether the particular instance of the user 306 is permitted to access the target device 304 based on the identity 404 of the user 306. For example, the access module 708 can search the access list 412 of FIG. 4 to determine whether the user 306 is listed in the access list 412. The access list 412 can be an access whitelist granting access to a device or an access blacklist denying access to a device. The access list 412 can be implemented as a relational database, a key-value database, an array database, a columnar database, an object oriented database, or a combination thereof. The access list 412 can be stored in the first storage unit 214, the second storage unit 246, or a combination thereof.

The access module 708 can also determine the accessibility 410 of the target device 304 to the client device 302 based on an input from the user 306. For example, the user 306 can select an instance of the target device 304 the user 306 intends to access using the client device 302. The user 306 can select the instance of the target device 304 by choosing from a dropdown menu, a scroll menu, an icon list, a map, or a combination thereof.

It has been discovered that determining the accessibility 410 of the target device 304 to the client device 302 based on the physical configuration 308 and the device location 334 of the target device 304 provides for a more improved method of choosing the target device 304. More specifically, determining the accessibility 410 of the target device 304 to the client device 302 based on the physical configuration 308, the device proximity 414 of the client device 302 to the target device 304, the device movement 326, the device orientation 324, or a combination thereof allows the electronic system 100 to quickly narrow down potential candidates for the target device 304 to those appropriate for the current instance of the physical configuration 308 of the client device 302.

It has further been discovered that determining the accessibility 410 of the target device 304 to the client device 302 based on the device location 334 and the physical configuration 308 of the target device 304 provides for improved resource usage. More specifically, determining the accessibility 410 of the target device 304 to the client device 302 based on the device proximity 414 of the client device 302 to the target device 304 and a particular instance of the physical configuration 308 reduces energy from being wasted on querying instances of the target device 304 not suitable for pairing with the client device 302 in the particular instance of the physical configuration 308.

Once the access module 708 has determined the accessibility 410 of the target device 304 to the client device 302, the access module 708 can grant the client device 302 access to the target device 304. The access module 708 can grant the client device 302 access to the target device 304 by generating the unlock signal 424 of FIG. 4, the wake-up signal 426 of FIG. 4, or a combination thereof. The access module 708 can generate the unlock signal 424, the wake-up signal 426, or a combination thereof using a wireless protocol via the communication path 104.

For example, the access module 708 can generate the unlock signal 424 to unlock a physical object such as an electronic door lock, an appliance lock such as an electronic refrigerator lock, or a combination thereof. In addition, the access module 708 can generate the unlock signal 424 to change the state of an electronic device from a locked state to an unlocked state. As a more specific example, the access module 708 can generate the unlock signal 424 to unlock a security screen of a computing device, such as a notebook, a desktop computer, a smartphone, or a combination thereof.

As an additional example, the access module 708 can generate the wake-up signal 426 to change the state of an electronic device from a sleep or standby state or mode to an active state. As a more specific example, the access module 708 can generate the wake-up signal 426 to change the state of a coffee-maker from a sleep state to an active state.

The access module 708 can be part of the first software 226, the second software 242, or a combination thereof. The first control unit 212 can execute the first software 226, the second control unit 234 can execute the second software 242, or a combination thereof to determine the accessibility 410 of the target device 304.

Moreover, the access module 708 can also communicate the accessibility 410 of the target device 304 between devices through the first communication unit 216, the second communication unit 236, or a combination thereof. After determining the accessibility 410 of the target device 304, the control flow can pass from the access module 708 to the operational module 710.

The operational module 710 is configured to generate the operational mode 338 of FIG. 3 of the client device 302. For example, the operational module 710 can generate the operational mode 338 as the monitor mode 340 of FIG. 3, the game mode 342 of FIG. 3, the gesture mode 344 of FIG. 3, or a combination thereof. The operational module 710 can generate the operational mode 338 in a variety of ways.

The operational module 710 can generate the operational mode 338 by determining the intention of the user 306 to operate the client device 302 in an instance of the operational mode 338. For example, the operational module 710 can infer the intention of the user 306 to undertake the operational mode 338 based on the physical configuration 308 of the client device 302, the device proximity 414 of the client device 302 to the target device 304, the device orientation 324 of the client device 302, the device movement 326 of the client device 302, or a combination thereof.

As a more specific example, the operational module 710 can infer the intention of the user 306 to operate the client device 302 in the monitor mode 340, the game mode 342, or a combination thereof when the physical configuration 308 of the client device 302 is in the handle configuration 314. As an even more specific example, the client device 302 can be implemented as a watch-type device, the operational module 710 can infer the intention of the user 306 to operate the watch-type device in the monitor mode 340, the game mode 342, or both the monitor mode 340 and the game mode 342 when the user 306 holds the watch-type device in one or two hands of the user 306 by the fastening unit 103 of the watch-type device.

In addition, the operational module 710 can infer the intention of the user 306 to operate the client device 302 in either the monitor mode 340 or the game mode 342 in the handle configuration 314 based on a change in the device orientation 324, the device movement 326, or a combination thereof. For example, the operational module 710 can infer the intention of the user 306 to operate the client device 302 in the game mode 342 when the operational module 710 detects a change in the device orientation 324 representing a rotation of the client device 302 beyond the orientation threshold 330 of FIG. 3 within an instance of the detection period 322. In this example, the orientation threshold 330 can be a 30 degree change in yaw or pitch within the detection period 322 of less than 1 second.

As an additional example, the operational module 710 can infer the intention of the user 306 to operate the client device 302 in the monitor mode 340 when the operational module 710 detects the device movement 326 representing a change in the device location 334 of the client device 302 beyond the movement threshold 328 within an instance of the detection period 322. In this example, the movement threshold 328 can be a change in the device location 334 of the client device 302 of more than 1 meter within the detection period 322 of less than 5 seconds.

As another example, the operational module 710 can infer the intention of the user 306 to operate the client device 302 in the monitor mode 340, the game mode 342, the gesture mode 344, or a combination thereof when the physical configuration 308 of the client device 302 is in the wearable configuration 316. As an even more specific example, the client device 302 can be implemented as a fitness band, the operational module 710 can infer the intention of the user 306 to operate the fitness band in any of the monitor mode 340, the game mode 342, the gesture mode 344, or a combination thereof when the user 306 secures the fitness band to a wrist of the user 306.

In addition, the operational module 710 can infer the intention of the user 306 to operate the client device 302 in the wearable configuration 316 in one or any combination of the monitor mode 340, the game mode 342, or the gesture mode 344 based on a change in the device orientation 324, the device movement 326, or a combination thereof. For example, the operational module 710 can infer the intention of the user 306 to operate the client device 302 in the monitor mode 340, the game mode 342, or a combination of the monitor mode 340 and the game mode 342 when the operational module 710 detects a change in the device orientation 324 representing a rotation of the client device 302 beyond the orientation threshold 330 of 20 degrees in any orientation within the detection period of less than 3 seconds.

Furthermore, the operational module 710 can infer the intention of the user 306 to operate the client device 302 as either the monitor mode 340 or the game mode 342 based on the device movement 326. More specifically, the operational module 710 can infer the intention of the user 306 to operate the client device 302 in the monitor mode 340 rather than the game mode 342 when the device movement 326 exceeds the movement threshold 328 of more than 3 meters within the detection period 322 of 20 seconds.

Moreover, the operational module 710 can infer the intention of the user 306 to operate the client device 302 in the gesture mode 344 when the client device 302 is in the wearable configuration 316 based on the device movement 326 and the device orientation 324. More specifically, the operational module 710 can infer the intention of the user 306 to operate the client device 302 in the gesture mode 344 in the wearable configuration 316 when neither the device movement 326 nor the device orientation 324 exceeds the movement threshold 328 or the orientation threshold 330, respectively. For example, the operational module 710 infer the user 306 intends to operate the client device 302 in the gesture mode when the client device 302 is in the wearable configuration 316 and no perceivable change in the device movement 326 or the device orientation 324 is detected within an instance of the detection period 322.

As yet another example, the operational module 710 can infer the intention of the user 306 to operate the client device 302 in the gesture mode 344 when the physical configuration 308 of the client device 302 is in the resting configuration 310 or the remote configuration 312. As an even more specific example, the client device 302 can be implemented as a watch-type device and the operational module 710 can infer the intention of the user 306 to operate the watch-type device in the gesture mode 344 when the watch-type device is either resting on a table top without being secured to the user 306 or the user 306 is applying the touch gesture 336 to the watch face with one hand while holding the device by the other hand.

The operational module 710 can further differentiate the gesture mode 344 into the touchless mode 346 of FIG. 3 or the touch mode 348 of FIG. 3. For example, the operational module 710 can infer the intention of the user 306 to operate the client device 302 in the touchless mode 346 when the physical configuration 308 of the client device 302 is in either the resting configuration 310 or the wearable configuration 316. Alternatively, the operational module 710 can infer the intention of the user 306 to operate the client device 302 in the touch mode 348 when the physical configuration 308 of the client device 302 is in any of the remote configuration 312, the wearable configuration 316, or the resting configuration 310.

The operational module 710 can determine the intention of the user 306 to operate the client device 302 in the touchless mode 346 by identifying the touchless gesture 350 of FIG. 3 based on the acoustic signal 352 of FIG. 3 transmitted from the client device 302. For example, the operational module 710 can determine the intention of the user 306 to operate the client device 302 in the touchless mode 346 based on an instance of the acoustic signal 352 received at the ultrasonic sensor 221. The operational module 710 can identify the touchless gesture 350 as a result of a physical phenomenon such as a wave propagation phenomenon. More specifically, the operational module 710 can identify the touchless gesture 350 as a result of a characteristic of a reflected acoustic wave or signal due to the Doppler effect or the Doppler shift.

Moreover, the operational module 710 can also determine the intention of the user 306 to operate the client device 302 in the touchless mode 346 by identifying the touchless gesture 350 based on an infrared signal, a radio frequency signal, a light reflectance, or a combination thereof. For example, the operational module 710 can identify the touchless gesture 350 through images captured of the touchless gesture 350.

The operational module 710 can determine the intention of the user 306 to operate the client device 302 in the touch mode 348 by detecting an instance of the contact reading 320 between the user 306 and a display interface of the client device 302 such as the first display interface 230. More specifically, the operational module 710 can determine the intention of the user 306 to operate the client device 302 in the touch mode 348 by detecting the contact reading 320 between the user 306 and the display interface while the client device 302 is in any of the remote configuration 312, the wearable configuration 316, or the resting configuration 310.

The operational module 710 can also determine the intention of the user 306 to operate the client device 302 in the operational mode 338 based on an input by the user 306. For example, the operational module 710 can determine the intention of the user 306 to operate the client device 302 in the game mode 342 based on the input by the user 306 through a selection made from a dropdown menu or list, an audio input, or a combination thereof.

The operational module 710 can generate the operational mode 338 by disabling one or more sensors of the client device 302, enabling one or more sensors of the client device 302, or a combination thereof. The operational module 710 can disable or enable one or more sensors of the client device 302 after determining the intention of the user 306 to operate the client device 302 in an instance of the operational mode 338.

The operational module 710 can enable a sensor of the client device 302 by activating one or more components of the sensor, putting the sensor in a wake mode, actively seeking an input for the sensor, or a combination thereof. The operational module 710 can disable a sensor of the client device 302 by deactivating one or more components of the sensor, putting the sensor in a sleep mode, ignoring an input received at the sensor, or a combination thereof.

As a more specific example, the operational module 710 can generate the game mode 342 by enabling one or more components of the location unit 220, the biometric unit 225, the contact sensor 223 in the fastening unit 103, or a combination thereof. In addition, the operational module 710 can generate the game mode 342 by disabling one or more components of the ultrasonic sensor 221, the contact sensor 223 coupled to a display interface such as the first display interface 230, or a combination thereof.

As an additional example, the operational module 710 can generate the monitor mode 340 by enabling one or more components of the location unit 220, the biometric unit 225, the contact sensor 223 in the fastening unit 103, or a combination thereof. In addition, the operational module 710 can generate the monitor mode 340 by disabling one or more components of the ultrasonic sensor 221, the contact sensor 223 coupled to a display interface such as the first display interface 230, or a combination thereof.

As another example, the operational module 710 can generate the gesture mode 344 representing the touchless mode 346 by enabling one or more components of the ultrasonic sensor 221, the location unit 220, or a combination thereof. In addition, the operational module 710 can generate the gesture mode 344 representing the touchless mode 346 by disabling one or more components of the biometric unit 225, the contact sensor 223, or a combination thereof.

As yet another example, the operational module 710 can generate the gesture mode 344 representing the touch mode 348 by enabling one or more components of the contact sensor 223, the location unit 220, or a combination thereof. In addition, the operational module 710 can generate the gesture mode 344 representing the touch mode 348 by disabling one or more components of the biometric unit 225, the ultrasonic sensor 221, or a combination thereof.

It has been discovered that generating the operational mode 338 based on the physical configuration 308 of the client device 302 by enabling or disabling one or more sensors of the client device 302 provides improved resource efficiency. More specifically, enabling certain sensors of the client device 302 and disabling other sensors based on the physical configuration 308 of the client device 302 reduces energy usage by not having to power sensors not currently being used by the client device 302 in a particular instance of the physical configuration 308. In addition, segmenting the functionality of the client device 302 into multiple instances of the operational mode 338 focuses the processing power of the electronic system 100 into processing commands or instructions essential to applications or programs desired by the user 306 in the particular instance of the physical configuration 308 such as gaming applications or health monitoring applications.

The operational module 710 can be part of the first software 226, the second software 242, or a combination thereof. The first control unit 212 can execute the first software 226, the second control unit 234 can execute the second software 242, or a combination thereof to generate the operational mode 338.

Moreover, the operational module 708 can also communicate the operational mode 338 between devices through the first communication unit 216, the second communication unit 236, or a combination thereof. After generating the operational mode 338, the control flow can pass from the operational module 710 to the contextual module 712.

The context module 712 is configured to determine the usage context 508. The context module 712 can determine the usage context 508 in a number of ways. For example, the context module 712 can determine the usage context 508 representing the usage order 510 of FIG. 5 based on the device movement 326 over time. As a more specific example, the context module 712 can determine the usage order 510 based on the device movement 326 by tracking the device location 334 of the client device 302 over a period of time. As a more specific example, the context module 712 can track the device movement 326 of the client device 302 in the last 60 minutes, the last 24 hours, the 72 hours, or a combination thereof.

The context module 712 can keep a record of the device type 422, the device identification 420, or a combination thereof of the instances of the target device 304 accessed by or previously connected to the client device 302. In addition, the context module 712 can keep a record of a sequence of the instances of the target device 304 accessed by or previously connected to the client device 302. Moreover, the context module 712 can also keep a record of the operational mode 338, the physical configuration 308, or a combination there at each instance of the target device 304 of the usage order 510.

As a more specific example, the context module 712 can determine the first instance of the target device 304 in the usage order 510 as a washing machine controlled by the client device 302 in the gesture mode 344 while in the wearable configuration 316. Continuing with this example, the context module 712 can determine the second instance of the target device 304 in the usage order 510 as a television controlled by the client device 302 in the game mode 342 while in the handle configuration 314. Finally, the context module 712 can determine the most recent instance of the target device 304 in the usage order 510 as a desktop computer controlled by the client device 302 in the gesture mode 344 while in the resting configuration 310.

As an additional example, the context module 712 can determine the usage context 508 representing the usage time 512 of FIG. 5. The context module 712 can determine the usage time 512 by keeping a record of when the client device 302 interacted with the target device 304. The context module 712 can determine the usage time 512 for each instance of the target device 304 included in the usage order 510. The context module 712 can determine the usage time 512 representing the time-of-day, the day-of-the-week, a specific calendar day, or a combination thereof.

As yet another example, the context module 712 can determine the usage context 508 representing the usage frequency 514 of FIG. 5. The context module 712 can determine the usage frequency 514 based on the usage order 510 and the usage time 512. As a more specific example, the context module 712 can determine the usage frequency 514 of the client device 302 connecting to a thermostat as twice a day on weekdays and once a day on the weekends.

The context module 712 can also store as part of the usage context 508 the session information 516 of FIG. 5 concerning a previous instance of the interaction between the client device 302 and the target device 304. For example, the context module 712 can store as part of the session information 516 the amount of time remaining on a countdown timer of a kitchen appliance, a video or audio bookmark indicating a pause or interruption in a video or audio content, or a progression marker indicating a pause or interruption in video game. The context module 712 can store the session information 516 as a timestamp, an interrupt, a digital marker, or a combination thereof.

The context module 712 can organize information concerning the usage context 508 in a relational database, a key-value database, an array database, a columnar database, an object oriented database, or a combination thereof. The context module 712 can also store the usage context 508 representing the usage order 510, the usage frequency 514, the usage time 512, or a combination thereof in the first storage unit 214, the second storage unit 246, or a combination thereof.

The context module 712 can be part of the first software 226, the second software 242, or a combination thereof. The first control unit 212 can execute the first software 226, the second control unit 234 can execute the second software 242, or a combination thereof to determine the usage context 508.

Moreover, the context module 712 can also communicate the usage context 508 between devices through the first communication unit 216, the second communication unit 236, or a combination thereof. After determining the usage context 508, the control flow can pass from the context module 712 to the target module 714.

The target module 714 is configured to determine the target connection 502 of FIG. 5 for connecting the client device 302 with the target device 304 and send the input signal 504 of FIG. 5 to the target device 304. The target module 714 can determine the target connection 502 in a variety of ways.

The target module 714 can infer the target connection 502 representing the desire or intention of the user 306 to connect the client device 302 with one or more instances of the target device 304. The target module 714 can infer the target connection 502 based on the accessibility 410 of the target device 304, the operational mode 338 of the client device 302, the physical configuration 308 of the client device 302, the usage context 508, the biometric indicator 602, or a combination thereof.

For example, the target module 714 can infer the target connection 502 by analyzing all currently accessible instances of the target device 304 for components or functionality compatible with the operational mode 338 of the client device 302. As a more specific example, the client device 302 can be in the gesture mode 344 representing the touchless mode 346 and the physical configuration 308 of the client device 302 can be in the resting configuration 310. In this example, the target module 714 can analyze all currently accessible instances of the target device 304 for those having a display interface such as the second display interface 240. The target module 714 can then analyze the usage context 508 to determine which of the instances of the target device 304 having the display interface the user 306 desires to connect with the client device 302.

In this example, the target module 714 can examine the usage time 512 including the current time-of-day and day-of-the week, the usage order 510 including the three preceding instances of the target device 304 connected to the client device 302, and the usage frequency 514 of the instances of the target device 304 having the display interface. As an even more specific example, the target module 714 can choose a desktop computer within 1 meter of the client device 302 for the target connection 502 because the user 306 has a history of using the client device 302 to control the desktop computer to browse the internet at the same time each weekday.

As an additional example, the client device 302 can be in the game mode 342 and the physical configuration 308 of the client device 302 can be in the handle configuration 314. In this example, the target module 714 can analyze all currently accessible instances of the target device 304 for those having a display interface above a certain size threshold. The target module 714 can then analyze the usage context 508 to determine which of the instances of the target device 304 having the display interface above the size threshold the user 306 has connected with in the past for gaming activities. Moreover, the target module 714 can analyze the device location 334 of the instances of the target device 304 to determine which instances of the target device 304 is located in an area suitable for the user 306 to make gaming motions with the client device 302. As a result of this analysis, the target module 714 can choose a networked television in a living room within 5 meters of the client device 302.

As yet another example, the client device 302 can be in the monitor mode 340 and the physical configuration 308 of the client device 302 can be in the wearable configuration 316. In this example, the target module 714 can analyze all currently accessible instances of the target device 304 for those capable of adjusting the target setting 610 of FIG. 6 based on the biometric indicator 602 of the user 306. In addition, the target module 714 can also analyze all currently accessible instances of the target device 304 for those capable of communicating a number, a text, a graphic, or a combination thereof.

As a more specific example, the client device 302 can detect both the heart rate 408 and the body temperature 606 of the user 306 as going up based on the heart rate reading 604 and the temperature reading 608. Based on these readings, the target module 714 can infer the user 306 intends to connect to a thermostat to adjust the target setting 610 of the thermostat to accommodate the rising heart rate and body temperate of the user 306. Moreover, the target module 714 can analyze all instances of the target device 304 accessible to the client device 302 having a display interface. The target module 714 can use this device to communicate numbers, text, or graphics associated with the biometric indicator 602 captured by the client device 302 to the user 306.

The target module 714 can also determine the target connection 502 based on an input from the user 306. For example, the user 306 apply an instance of the touch gesture 336, the touchless gesture 350, or a combination thereof to select the target device 304. As a more specific example, the user 306 can select the instance of the target device 304 by choosing from a dropdown menu, a scroll menu, an icon list, a map, or a combination thereof. In addition, the user 306 can provide an audio input to select the target device 304.

The target module 714 is also configured to send the input signal 504 to the target device 304 once the target connection 502 has been established. The target module 714 can send the input signal 504 to the target device 304 to interact with the target device 304 using the client device 302. The input signal 504 can be used by the client device 302 to change a state of the target device 304.

For example, the input signal 504 can include the wake-up signal 426, the unlock signal 424, or a combination thereof. As a more specific example, the input signal 504 can be a signal invoking an event call, an Application Programming Interface (API) call, an operating system (OS) call, or a combination thereof. The input signal 504 can be implemented as a Bluetooth™ signal such as a Bluetooth™ Low Energy (BLE) signal, a WiFi signal, an acoustic signal, an infrared signal, or a combination thereof.

The target module 714 is also configured to generate the haptic feedback 518 of FIG. 5 for communicating the target response 520 of FIG. 5 from the target device 304. The target module 714 can generate the haptic feedback 518 through the first user interface 218 when the client device 302 is in the handle configuration 314, the wearable configuration 316, or the remote configuration 312. The target module 714 can generate the haptic feedback 518 in response to the target response 520 from the target device 304.

For example, the target module 714 can generate the haptic feedback 518 to communicate the occurrence or presence of an alert, a notification, a pop-up window to the user 306 of the client device 302. As an additional example, the target module 714 can generate the haptic feedback 518 to communicate the reception of a command or an instruction by the target device 304 from the client device 302. As a more specific example, the target module 714 can generate the haptic feedback 518 by vibrating the client device 302 worn on the wrist of the user 306. The haptic feedback 518 can update the user 306 on the operational status of an instance of the target device 304 such as a washing machine, a stove, a dishwasher, or a combination thereof.

The target module 714 can be part of the first software 226, the second software 242, or a combination thereof. The first control unit 212 can execute the first software 226, the second control unit 234 can execute the second software 242, or a combination thereof to determine the target connection 502 and send the input signal 504.

Moreover, the target module 714 can also communicate the target connection 502 and the input signal 504 between devices through the first communication unit 216, the second communication unit 236, or a combination thereof. After determining the target connection 502 and sending the input signal 504, the control flow can pass from the target module 714 to the personalization module 716.

The personalization module 716 is configured to generate the personalized content 506 of FIG. 6 and the target setting 610 of FIG. 6. The personalization module 716 can generate the personalized content 506 and the target setting 610 in a number of ways.

The personalization module 716 can generate the personalized content 506 based on the usage context 508. For example, the personalization module 716 can generate the personalized content 506 based on the usage order 510, the usage time 512, the session information 516, or a combination thereof. As a more specific example, the client device 302 can be a watch-type device and the user 306 can establish the target connection 502 with a WiFi enabled television as the target device 304. The personalization module 716 can detect the usage context 508 of the electronic system 100 as the user 306 previously having watched ¾ of a movie on a desktop computer while also wearing the client device 302. The personalization module 716 can determine the stopping point of the movie from the session information 516 of the previous instance of the target connection 502 between the client device 302 and the desktop computer. Based on this information, the personalization module 716 can generate the personalized content 506 on the WiFi enabled television as the remaining ¼ of the movie started by the user 306.

The personalization module 716 can also generate the personalized content 506 based on the biometric signature 402, the biometric indicator 602 of the user 306, or a combination thereof. For example, the personalization module 716 can generate the personalized content 506 based on the identity 404 of the user 306 obtained through the biometric unit 225. As an additional example, the personalization module 716 can generate the personalized content 506 based on the biometric indicator 602 of the user 306.

It has been discovered that generating the personalized content 506 based on the identity 404 of the user 306 determined from the biometric signature 402 obtained using the client device 302 improves the usability of the client device 302. More specifically, the same instance of the client device 302 can be used by multiple instances of the user 306. In addition, determining the identity 404 of the user 306 from the biometric signature 402 of the user 306 is a more secure method of authenticating the user 306 and generating the personalized content 506 based on the biometric signature 402 reduces the likelihood of unauthorized access to content not intended for a particular instance of the user 306.

As a more specific example, the personalization module 716 can generate the personalized content 506 based on the heart rate reading 604, the temperature reading 608 of the user 306, or a combination thereof. In addition, the personalization motion 716 can generate the personalized content 506 by displaying the heart rate reading 604, the temperature reading

608, or a combination thereof on a display interface of the target device 304. Moreover, the personalization module 716 can generate the target setting 610 based on the biometric indicator 602 of the user 306, the device movement 326, or a combination thereof. The personalization module 716 can generate the target setting 610 by establishing the target connection 502 with an occupancy system such as a thermostat, a heating unit, a cooling unit, or a combination thereof.

For example, the personalization module 716 can generate the target setting 610 by increasing or decreasing a temperature setting of the thermostat. As an additional example, the personalization module 716 can generate the target setting 610 by turning on or off the heating unit, the cooling unit, or a combination thereof. As a more specific example, the client device 302 can be a watch-type device and the electronic system 100 can detect the user 306 has finished a workout based on the heart rate reading 604, the temperature reading 608, the device movement 326, or a combination thereof. In this example, the personalization module 716 can generate the target setting 610 to accommodate the elevated instances of the heart rate 408 and the body temperature 606 of the user 306. More specifically, the personalization module 716 can establish the target connection 502 with an instance of the target device 304 representing a cooling unit to turn on the cooling unit.

It has been discovered that generating the personalized content 506 based on the biometric indicator 602 of the user 306 improves the user experience of the client device 302. More specifically, the user 306 can adjust usage of the client device 302 in a particular mode, such as the game mode 342, based on a change in the biometric indicator 602 such as the heart rate 408, the body temperature 606, or a combination thereof of the user 306.

The personalization module 716 can be part of the first software 226, the second software 242, or a combination thereof. The first control unit 212 can execute the first software 226, the second control unit 234 can execute the second software 242, or a combination thereof to generate the personalized content 506.

Moreover, the personalization module 716 can also communicate the personalized content 506 between devices through the first communication unit 216, the second communication unit 236, or a combination thereof.

Figure 8:
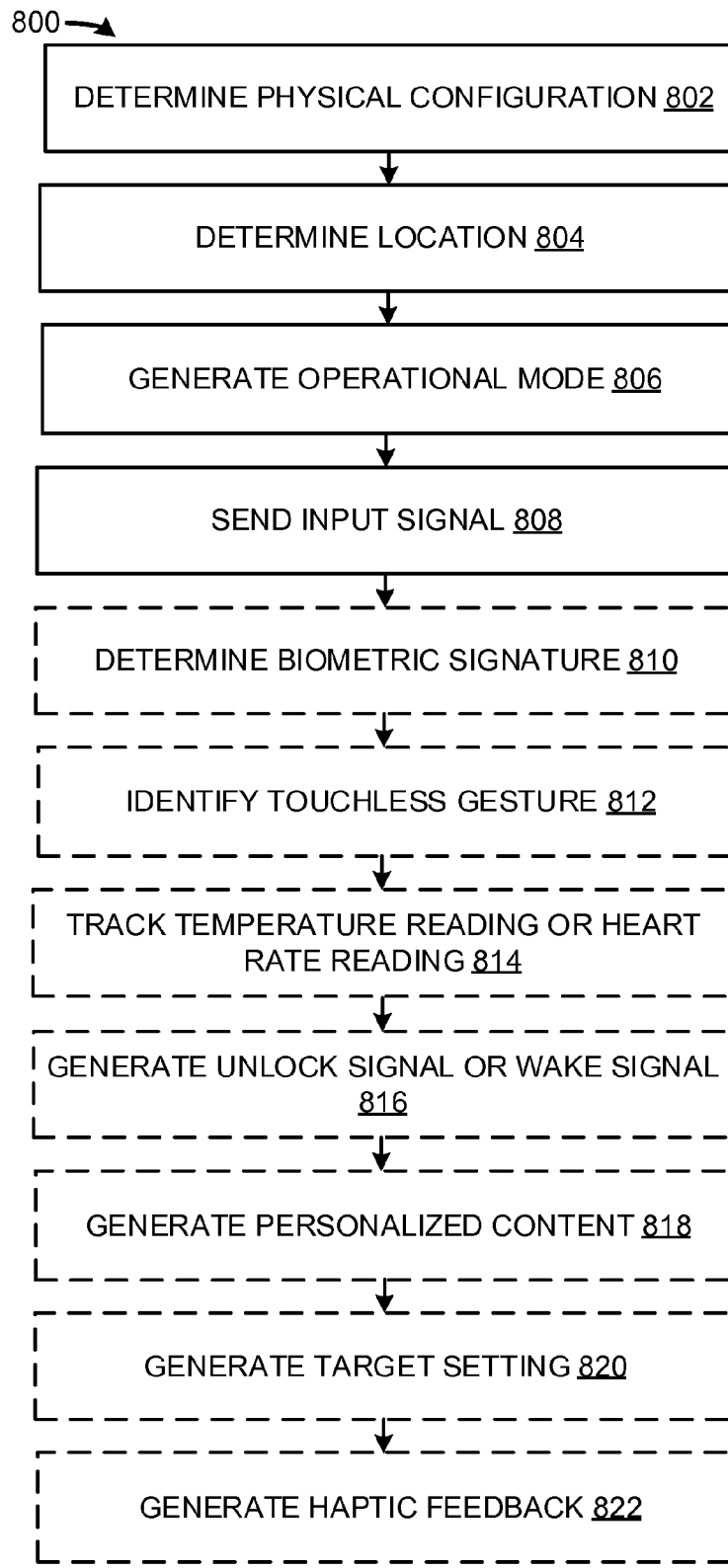
FIG. 8 is a flow chart of a method of operation of the electronic system in a further embodiment of the present invention.

Referring now to FIG. 8, therein is shown an exemplary flow chart 800 of a method of operation of an electronic system 100 of FIG. 1 in a further embodiment. In one example embodiment, the electronic system 100 can implement the control flow 700 of FIG. 7.

The exemplary flow chart 800 can include determining the physical configuration 308 of FIG. 3 based on the sensor reading 318 of FIG. 3 in a box 802. The electronic system 100 can use the configuration module 702 of FIG. 7 to determine the physical configuration 308. The exemplary flow chart 800 can further include determining the device location 334 of FIG. 3 for establishing the device proximity 414 of FIG. 4 to the target device 304 of FIG. 1 in a box 804. The electronic system 100 can use the location module 706 of FIG. 7 to determine the device location 334.

The exemplary flow chart 800 can further include generating the operational mode 338 of FIG. 3 based on the physical configuration 308 and the device proximity 414 in a block 806. The electronic system 100 can use the operational module 710 of FIG. 7 to generate the operational mode 338. The exemplary flow chart 800 can further include sending the input signal 504 of FIG. 5 for interacting with the target device 304 through the client device 302 of FIG. 1 in a block 808. The electronic system 100 can use the target module 714 of FIG. 7 to send the input signal 504.

The exemplary flow chart 800 can further include determining the biometric signature 402 of FIG. 4 for recognizing the identity 404 of FIG. 4 at the client device 302 in a block 810. The electronic system 100 can use the biometric module 704 of FIG. 7 to determine the biometric signature 402. The exemplary flow chart 800 can further include identifying the touchless gesture 350 for controlling the first user interface 218 of FIG. 2 of the target device 304 based on the acoustic signal 352 transmitted from the client device 302 in a block 812. The electronic system 100 can use the operational module 710 to identify the touchless gesture 350.

The exemplary flow chart 800 can further include tracking the temperature reading 608 of FIG. 6, the heart rate reading 604 of FIG. 6, or a combination thereof at the client device 302 in a block 814. The electronic system 100 can use the biometric module 704 to track the temperature reading 608, the heart rate reading 604, or a combination thereof. The exemplary flow chart 800 can further include generating the unlock signal 424 of FIG. 4, the wake-up signal 426 of FIG. 4, or a combination thereof in a block 816. The electronic system 100 can use the access module 708 of FIG. 7 to generate the unlock signal 424, the wake-up signal 426, or a combination thereof.

The exemplary flow chart 800 can further include generating the personalized content 506 of FIG. 5 for displaying on the target device 304 based on the usage context 508 of FIG. 5 in a block 818. The electronic system 100 can use the personalization module 716 of FIG. 7 to generate the personalized content 506. The exemplary flow chart 800 can further include generating the target setting 610 of FIG. 6, the personalized content 506, or a combination thereof based on the temperature reading 608, the heart rate reading 604, or a combination thereof at the target device 304 in a block 820. The electronic system 100 can use the personalization module 716 to generate the target setting 610, the personalized content 506, or a combination thereof.

The exemplary flow chart 800 can further include generating the haptic feedback 518 of FIG. 5 through the client device 302 for communicating the target response 520 of FIG. 5 from the target device 304 in a block 822. The electronic system 100 can use the target module 714 to generate the haptic feedback 518.

The modules described herein can be hardware implementation or hardware accelerators, including passive circuitry, active circuitry, or both, in the first control unit 212 of FIG. 3, the second control unit 234 of FIG. 2, or a combination thereof. The modules can also be hardware implementation or hardware accelerators, including passive circuitry, active circuitry, or both, within the first device 102, the second device 106, or a combination thereof but outside of the first control unit 212, the second control unit 234, or a combination thereof.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214 of FIG. 2, the second storage unit 246 of FIG. 2, or a combination thereof can represent the non-transitory computer readable medium. The first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a control unit configured to:
   determine a physical configuration based on a sensor reading, the physical configuration for representing a specific physical shape or arrangement of a client device from a set of shapes or arrangements with each shape or arrangement therein corresponding to a respective configuration;
   determine a device location for establishing a device proximity to a target device;
   generate an operational mode based on the physical configuration and the device proximity; and
   a communication unit, coupled to the control unit, configured to send an input signal for interacting with the target device through the client device.

2. The system as claimed in claim 1 wherein the control unit is further configured to:
   determine a biometric signature for recognizing an identity at the client device; and
   generate a personalized content based on the biometric signature and the device proximity.

3. The system as claimed in claim 1 wherein the control unit is further configured to:
   determine a biometric signature for recognizing an identity at the client device; and
   generate an unlock signal, a wake-up signal, or a combination thereof based on the biometric signature and the device proximity for accessing the target device.

4. The system as claimed in claim 1 wherein the control unit is further configured to identify a touchless gesture for controlling a user interface of the target device based on an acoustic signal transmitted from the client device.

5. The system as claimed in claim 1 wherein the control unit is further configured to generate a personalized content for displaying on the target device based on a usage context.

6. The system as claimed in claim 1 wherein the control unit is further configured to:
   determine the physical configuration as a wearable configuration based on a contact reading; and
   generate the operational mode as a monitor mode based on the wearable configuration, a device orientation, a device movement, the device proximity, or a combination thereof.

7. The system as claimed in claim 1 wherein the control unit is further configured to:
   determine the physical configuration as a handle configuration based on a contact reading; and
   generate the operational mode of the client device as a game mode based on the handle configuration, a device orientation, a device movement, the device proximity to the target device, or a combination thereof.

8. The system as claimed in claim 1 wherein the control unit is further configured to:
   track a temperature reading for gauging a body temperature at the client device; and
   generate a target setting, a personalized content, or a combination thereof based on the temperature reading for implementing on the target device.

9. The system as claimed in claim 1 wherein the control unit is further configured to:
   track a heart rate reading for gauging a heart rate at the client device; and
   generate a target setting, a personalized content, or a combination thereof based on the heart rate reading for implementing on the target device.

10. The system as claimed in claim 1 wherein the control unit is further configured to generate a haptic feedback through the client device for communicating a target response from the target device.

11. A method of operation of an electronic system comprising:
    determining, with a control unit, a physical configuration based on a sensor reading, the physical configuration for representing a specific physical shape or arrangement of a client device from a set of shapes or arrangements with each shape or arrangement therein corresponding to a respective configuration;
    determining a device location for establishing a device proximity to a target device;
    generating an operational mode based on the physical configuration and the device proximity; and
    sending, with a communication unit coupled to the control unit, an input signal for interacting with the target device through the client device.

12. The method as claimed in claim 11 further comprising:
    determining a biometric signature for recognizing an identity at the client device; and
    generating a personalized content based on the biometric signature and the device proximity.

13. The method as claimed in claim 11 further comprising:
    determining a biometric signature for recognizing an identity at the client device; and
    generating an unlock signal, a wake-up signal, or a combination thereof based on the biometric signature and the device proximity for accessing the target device.

14. The method as claimed in claim 11 further comprising identifying a touchless gesture for controlling a user interface of the target device based on an acoustic signal transmitted from the client device.

15. The method as claimed in claim 11 further comprising generating a personalized content for displaying on the target device based on a usage context.

16. The method as claimed in claim 11 further comprising:
   determining the physical configuration as a wearable configuration based on a contact reading; and
   generating the operational mode as a monitor mode based on the wearable configuration, a device orientation, a device movement, the device proximity, or a combination thereof.

17. The method as claimed in claim 11 further comprising:
   determining the physical configuration as the handle configuration based on a contact reading; and
   generating the operational mode of the client device as the game mode based on the handle configuration, a device orientation, a device movement, the proximity of the client device, or a combination thereof.

18. The method as claimed in claim 11 further comprising:
   tracking a temperature reading for gauging a body temperature at the client device; and
   generating a target setting, a personalized content, or a combination thereof based on the temperature reading for implementing on the target device.

19. The method as claimed in claim 11 further comprising:
   tracking a heart rate reading for gauging a heart rate at the client device; and
   generating a target setting, a personalized content, or a combination thereof based on the heart rate reading for implementing on the target device.

20. The method as claimed in claim 11 further comprising generating a haptic feedback through the client device for communicating a target response from the target device.

21. A non-transitory computer readable medium including instructions for execution by a control unit for an electronic system, the instructions comprising:
   determining a physical configuration based on a sensor reading, the physical configuration for representing a specific physical shape or arrangement of a client device from a set of shapes or arrangements with each shape or arrangement therein corresponding to a respective configuration;
   determining a device location for establishing a device proximity to a target device;
   generating an operational mode based on the physical configuration and the device proximity; and
   sending an input signal for interacting with the target device through the client device.

22. The non-transitory computer readable medium as claimed in claim 21, the instructions further comprising:
   determining a biometric signature for recognizing an identity at the client device; and
   generating a personalized content based on the biometric signature and the device proximity.

23. The non-transitory computer readable medium as claimed in claim 21, the instructions further comprising:
   determining a biometric signature for recognizing an identity at the client device; and
   generating an unlock signal, a wake-up signal, or a combination thereof based on the biometric signature and the device proximity for accessing the target device.

24. The non-transitory computer readable medium as claimed in claim 21, the instructions further comprising identifying a touchless gesture for controlling a user interface of the target device based on an acoustic signal transmitted from the client device.

25. The non-transitory computer readable medium as claimed in claim 21, the instructions further comprising generating a personalized content for displaying on the target device based on a usage context.

26. The non-transitory computer readable medium as claimed in claim 21, the instructions further comprising:
   determining the physical configuration as a wearable configuration based on a contact reading; and
   generating the operational mode as a monitor mode based on the wearable configuration, a device orientation, a device movement, the device proximity, or a combination thereof.

27. The non-transitory computer readable medium as claimed in claim 21, the instructions further comprising:
   determining the physical configuration as the handle configuration based on a contact reading; and
   generating the operational mode of the client device as the game mode based on the handle configuration, a device orientation, a device movement, the proximity of the client device, or a combination thereof.

28. The non-transitory computer readable medium as claimed in claim 21, the instructions further comprising:
   tracking a temperature reading for gauging a body temperature at the client device; and
   generating a target setting, a personalized content, or a combination thereof based on the temperature reading for implementing on the target device.

29. The non-transitory computer readable medium as claimed in claim 21, the instructions further comprising:
   tracking a heart rate reading for gauging a heart rate at the client device; and
   generating a target setting, a personalized content, or a combination thereof based on the heart rate reading for implementing on the target device.

30. The non-transitory computer readable medium as claimed in claim 21, the instructions further comprising generating a haptic feedback through the client device for communicating a target response from the target device.

* * * * *